US009215270B2

(12) United States Patent
Mohaban et al.

(10) Patent No.: US 9,215,270 B2
(45) Date of Patent: Dec. 15, 2015

(54) SYSTEM AND METHOD FOR DETERMINING A TOPOLOGY OF AT LEAST ONE APPLICATION IN A COMPUTERIZED ORGANIZATION

(75) Inventors: Shai Mohaban, Kiryat Tivon (IL); Haviv Rosh, Modiin (IL); Yarin Benado, Ramat-Gan (IL); Yuval Cohen, Raanana (IL)

(73) Assignee: SERVICENOW, INC., Santa Clara, CA (US)

( * ) Notice: Subject to any disclaimer, the term of this patent is extended or adjusted under 35 U.S.C. 154(b) by 242 days.

(21) Appl. No.: 13/816,142

(22) PCT Filed: Aug. 9, 2011

(86) PCT No.: PCT/IL2011/000644
§ 371 (c)(1),
(2), (4) Date: Aug. 20, 2013

(87) PCT Pub. No.: WO2012/020405
PCT Pub. Date: Feb. 16, 2012

(65) Prior Publication Data
US 2013/0332590 A1 Dec. 12, 2013

Related U.S. Application Data

(60) Provisional application No. 61/371,932, filed on Aug. 9, 2010.

(51) Int. Cl.
G06F 17/30 (2006.01)
H04L 29/08 (2006.01)
G06Q 10/10 (2012.01)

(52) U.S. Cl.
CPC .......... *H04L 67/10* (2013.01); *G06F 17/30091* (2013.01); *G06Q 10/10* (2013.01)

(58) Field of Classification Search
USPC .................................. 709/223, 224, 226, 221
See application file for complete search history.

(56) References Cited

U.S. PATENT DOCUMENTS 4,827,411 A 5/1989 Arrowood et al.
4,914,571 A 4/1990 Baratz et al.
(Continued)

OTHER PUBLICATIONS

BMC Atrium Discovery and Dependency Mapping, Data Sheet (online), Dec. 2009.
(Continued)

Primary Examiner — Jude Jean Gilles
(74) Attorney, Agent, or Firm — Young Basile Hanlon & MacFarlane, P.C.

(57) ABSTRACT

A computerized method for determining a structure of at least one application in a computerized organization, the method comprising receiving at least one entry point including an identification of a virtual location on a computer network; for each entry point, receiving a determination of an individual applicative component that processes data arriving through that entry point; identifying at least some communicating entry points through which the first applicative component communicates with additional applicative components; and for each of the at least some communicating entry points, using a processor for determining the applicative component that processes data arriving through that communicating entry point; and providing at least a portion of a structure including: applicative components associated with the application and information with regard to which of the applicative component communicates with which.

24 Claims, 14 Drawing Sheets

(56) References Cited

U.S. PATENT DOCUMENTS

| | | | |
|---|---|---|---|
| 5,185,860 | A | 2/1993 | Wu |
| 5,222,242 | A | 6/1993 | Choi et al. |
| 5,367,667 | A | 11/1994 | Wahlquist et al. |
| 5,659,547 | A | 8/1997 | Scarr et al. |
| 5,787,252 | A | 7/1998 | Schettler et al. |
| 5,978,594 | A | 11/1999 | Bonnell et al. |
| 6,286,047 | B1 | 9/2001 | Ramanathan et al. |
| 6,701,327 | B1 | 3/2004 | Jones et al. |
| 6,983,321 | B2 | 1/2006 | Trinon et al. |
| 7,027,411 | B1 | 4/2006 | Pulsipher et al. |
| 7,392,300 | B2 | 6/2008 | Anantharangachar et al. |
| 7,685,577 | B2 | 3/2010 | Pace et al. |
| 7,987,472 | B2 | 7/2011 | Hager et al. |
| 8,024,772 | B1* | 9/2011 | Yehuda et al. ................ 726/1 |
| 8,612,574 | B2 | 12/2013 | Akiyama et al. |
| 2003/0058277 | A1 | 3/2003 | Bowman-Amuah |
| 2003/0204846 | A1* | 10/2003 | Breen ............... H04N 5/44543 725/39 |
| 2006/0256733 | A1 | 11/2006 | Bejerano |
| 2007/0050187 | A1* | 3/2007 | Cox ................................. 704/9 |
| 2008/0022271 | A1 | 1/2008 | D'Angelo et al. |
| 2008/0082978 | A1 | 4/2008 | Or et al. |
| 2008/0140616 | A1* | 6/2008 | Encina ............ G06F 17/30864 |
| 2009/0013800 | A1 | 1/2009 | Mehendale et al. |
| 2009/0131072 | A1* | 5/2009 | Razdan et al. ............ 455/456.1 |
| 2009/0227464 | A1* | 9/2009 | Avigad ................ C12Q 1/6886 506/9 |
| 2009/0254572 | A1 | 10/2009 | Redlich et al. |
| 2010/0094981 | A1* | 4/2010 | Cordray ............... G06F 15/177 709/222 |
| 2010/0242032 | A1 | 9/2010 | Ladki et al. |
| 2010/0304756 | A1* | 12/2010 | Yang .................... H04W 64/00 455/456.1 |
| 2011/0321033 | A1 | 12/2011 | Kelkar et al. |

OTHER PUBLICATIONS

Multitier architecture, From Wikipedia, the free encyclopedia http://en.wikipedia.org/w/index.php?title=Multitier_architecture&oldid=442967738, Aug. 4, 2011, downloaded May 5, 2014.

Business service management From Wikipedia, the free encyclopedia http://en.wikipedia.org/w/index.php?title=Business_service_management&oldid=441834362, Jul. 28, 2011, downloaded May 5, 2014.

Computer cluster From Wikipedia, the free encycolpedia http://en.wikipedia.org/w/index.php?title=Computer_cluster&oldid=440044562, Jul. 18, 2011, downloaded May 5, 2014.

Schwartz, Michael F.; "The Networked Resource Discovery Project", Department of Computer Science, University of Colorado, Oct. 1988, 16 pp.

Pandey et al.; "IP Network Topology Discovery Using SNMP", Department of Computer Science and Engineering, Postech, Korea, Date Unknown, 5 pp.

Wood et al.; "Fremont: A System for Discovering Network Characteristics and Problems", 1993 Winter USENIX, Jan. 25, 1993, San Diego, CA, 14 pp.

Schwartz, Michael F.; "Resource Discovery and Related Research at the University of Colorado; CU-CS-508-91", (1990), Computer Science Technical Reports, Paper 488, 16 pp.

Bieszczad et al.; "Mobile Agents for Network Management", IEEE Communications Surveys, http://www.comsoc.org/pubs/surveys, Fourth Quarter 1998, vol. 1, No. 1, 8 pp.

* cited by examiner

FIG. 1

10: Initial discovery (skeleton-based and/or top-down), e.g., as per figs. 2a – 2c
↓
20: store structure as discovered.
↓
30: Use structure: To prioritize calls to IT department or to compensate "stricken" applications by identifying and replacing elements causing the call; and/or to schedule non-emergency maintenance or to identify and "compensate" maintenance-affected applications by temporarily substituting maintenance-disabled elements used by these applications
↓
40: Optional: Derive skeleton from structure stored in operation 20, e.g., as per Fig. 4
↓
50: Periodically re-discover structure including storing updated structure accordingly. Optional: using skeleton, e.g., as per Fig. 8, in which case re-discovery includes updating skeleton of step 40; store updated structure if skeleton is found to be unchanged; else identify portion of application for which initial discovery is to be repeated; repeat initial discovery (e.g., using figs. 2a – 2c) for that portion only; combine structure of other portions with new structure of portion for which initial discovery was repeated, and derive new skeleton from combined structure (e.g., using Fig. 4)
↓
60: Accepting events/alerts (e.g. directly from elements, or from external monitoring systems), associating the events/alerts with appropriate elements and computing impact on applications those elements belong to using an impact tree which is part of the skeleton

FIG. 2a

120: Provide Application entry point, e.g., prompt user to manually provide or automatically derive, e.g., by querying another system (e.g., a user transaction monitoring system such as HP BAC or Aternity) which hold the entry points
↓
125: If application corresponding to entry point provided in step 120 has never been discovered or system has decided (e.g. because re-discovery based on skeleton detected some change in the application structure) that the application topology stored in the application's skeleton is no longer up-to-date, proceed; otherwise, terminate.
↓
130: Prompt user to provide inputs a and/or b:

a. Knowledge base of patterns describing how to identify each component and connections from component identified to subsequent components. Knowledge base may be constructed in set-up stage in which each and every type of application supported is analyzed so as to determine some or all of: how to identify it (e.g., what is the process name and how to extract its version), how the application is installed, how the application is configured, where the application's configuration parameters reside, how to determine the configurations of the application's connections to other components. A pattern is then generated accordingly, which is operative to identify an individual application component and connections emanating from it.

b. Credentials to enable sufficient access level to each component (e.g., host) to retrieve all information employed by knowledge base 135: Use identity matching process (e.g., as per Fig. 3) that checks whether a discovered object, e.g., CI, was already discovered earlier, e.g., by using suitable attributes of each CI to uniquely identify it. Attributes of the CI are typically compared in a certain order e.g. as described herein with reference to Fig. 3]
↓
go to Fig. 2b, step 140

FIG. 2B

140: For entry point provided, create an initial connection according to the entry point type.
↓
150: If a hostname (as opposed to an IP address) is defined in the entry point:
↓
160: Perform DNS lookup for the hostname.
↓
170: If the hostname is resolved to multiple IP (Internet Protocol) addresses, generate a cluster object having the current connection as its input, and having outgoing connections per each resolved IP address with the same entry point values except replacing the hostname with the relevant IP address.
↓
180: The current connection defines first and second connected applicative CIs. Look up, e.g., in a stored result of a previous network device discovery process, all NAT and other network devices en route between the first CI, and a second CI that has a dependency either from the first CI or from one or more intermediate CIs that have dependencies, ultimately, from the first CI. The route interconnecting the first and second CIs, which may run through many intermediate CIs, may run through multiple network devices.
↓
185: Analyze NAT and other network devices found en route to see if the provided entry point is "affected", i.e., if the provided entry point points to an address that is being translated by an en route NAT device/network device (e.g., if the entry point is a virtual address/port on a network device that is mapped to a different address/port, the entry point is "affected"). If the provided entry point is affected, use the entry point information mapped (in step 180) after the network address translation to create a new connection.
↓
go to Fig. 2c, step 190

FIG. 2c

190: Check if OS (operating system) discovery for the host (also termed herein "target computer") pointed to by the entry point has not been performed yet (indicating the target computer was never discovered); if so, run OS discovery for this target host.

200. Identify the relevant process running on the host, e.g., by identifying the unique process that is (a) running on the target host identified by the entry point's host name/IP address and (b) serving (listening to) the port whose number is designated at the entry point; and getting at least one attribute of that process 210: Find, in the knowledge base, the discovery patterns which are applicable to the given entry point type and to the OS running on the target host 215: Execute all discovery patterns identified in step 210, one after the other, and stop as soon as one discovery pattern succeeds in discovering and creating a CI object.

220: For the newly created CI object, run all of its deterministic connection pattern sections and for each discovered connection, create a connection object.

230: If possible, reconcile newly created objects with existing objects in the topology database (using suitable identity matching logic, e.g., as per Fig. 3).

240: If unresolved connections exist (connections on which steps 150 – 230 have yet to be run), define each such connection as an entry point and return to step 150 so as to recursively identify further elements dependent on that entry point. If no unresolved connections exist, end.

FIG. 4

300. Provide structure generated by initial discovery and stored in step 20.

↓

310: Use application topology discovered in the initial discovery of step 10 as stored in step 20, to generate a template for the application topology including division into tiers and application flows between tiers.

↓

320: Gather from actual discovered topology NAT and other network devices along the path that affect the application flow and the address translation applicable to each of them; add this to initial skeleton generated in step 310.

↓

330: Modify template: Replace discovered clusters of CIs with a generic cluster placeholder to accommodate changes within a cluster without affecting the skeleton.

↓

340: Modify template: Delete host information for CIs so these are not stored in the skeleton, i.e., only the applicative CIs may be stored.

↓

350: Add to template: For each tier & CI, add the discovery pattern and the identification section inside it that were used to discover it.

↓

360: Add to template: Define a re-discovery frequency per tier as one of: High/medium/low (the exact frequency in minutes per each category may be user defined in the administrative preferences).

↓

370: Add to template: Credentials used per each identified CI. Note: This is the only skeleton component that is stored per identified CI and not per tier.

↓

380: Add Impact rules describing how events should be propagated along the application structure

↓

390: Add manually defined discovery refinements

FIG. 7:

610: Obtain current application structure (e.g., using top-down discovery).
↓
620: Store structure as discovered.
↓
630: Derive skeleton from structure stored in step 620.
↓
640: Periodically re-discover structure using skeleton info derived in 630
↓
650 Periodically, less frequently than in step 640, run full discovery to find any changes in skeleton itself. If any changes found, go back to step 630.

FIG. 8

410: Provide:
- a. Application skeleton, which typically includes entry point and relevant knowledge base parts to apply in each tier.
- b. Credentials to enable sufficient access level to each component (e.g., host) to retrieve all information required by the knowledge base.

↓

420: Traverse the application skeleton generated by Fig. 4.

↓

430: For each skeleton connection a discovery task is created with information that was stored in the skeleton. The information typically includes at least some of: the pattern that is to be executed, credentials that are to be used and/or the frequency with which this task need to be performed.

↓

440: Until skeleton is deemed invalid, perform all tasks created in step 430 (given its frequency). A skeleton is deemed invalid when the discovery process finds changes that contradict the current skeleton structure. This can happen, e.g., if a previously discovered connection is gone, or if some CI type has changed.

↓

450: Use result of step 440 to update the topology of the application in case changes are detected.

↓

460: If failures are detected and/or if new information is discovered that is inconsistent with that stored in the skeleton, mark skeleton as invalid and re-initiate Initial Discovery process on at least part of the application.

Fig. 9:

510: Generate skeleton from application structure.
↓
520: Derive default impact tree from skeleton. For example, define default impact tree such that:
a. For non-clustered children in skeleton, the computed state of the parent in the default impact tree is the state of the child.
b. For clustered children in skeleton, the state of the parent in the default impact tree is defined to be the state of the child whose state is most severe
↓
530: Let user change defaults if desired; e.g., a functionality may be provided that changes the rule regarding clustered children
↓
540: Each time status of an element of an application changes, recompute the impact tree :
↓
550: For each parent Y of element X
↓
560: Compute new state of Y according to impact rules
↓
570: Set the state of Y to the more severe between its current state and the state computed in step 60. If state of Y changes, then steps 50 and 60 are of course performed for each parent of Y
↓
580: Use impact tree to show state of entire application. E.g. on a dashboard show all discovered applications, each colored or otherwise designated according to its state/health. Also can use impact tree for what-if scenarios: e.g. show what would be the status of a given application if a certain element status changes. Determine accordingly if an element can be removed or can be serviced at a certain time.

FIG. 10
1010: Receive event changing the status of element X.
1020: For each Y parent of X, use the impact tree rules and the new status of X to compute the new status of Y, and update it to the more severe between this newly computed value and its own value.
1030: If status of Y changed, repeat step 1020 with Y instead of X

SYSTEM AND METHOD FOR DETERMINING A TOPOLOGY OF AT LEAST ONE APPLICATION IN A COMPUTERIZED ORGANIZATION

REFERENCE TO CO-PENDING APPLICATIONS

Priority is claimed from U.S. Patent Application No. 61/371,932, entitled "A system and method for top-down application discovery and modeling and/or efficient skeleton-based application re-discovery" and filed Aug. 9, 2010.

FIELD OF THE INVENTION

The present invention relates generally to computerized management of a computerized organization.

BACKGROUND OF THE INVENTION

Conventional technology pertaining to certain embodiments of the present invention is described in the following publications, inter alia:

Wikipedia describes that "In software engineering, multi-tier architecture (often referred to as n-tier architecture) is a client-server architecture in which the presentation, the application processing, and the data management are logically separate processes. For example, an application that uses middleware to service data requests between a user and a database employs multi-tier architecture. The most widespread use of multi-tier architecture is three-tier architecture.

"N-tier application architecture provides a model for developers to create a flexible and reusable application. By breaking up an application into tiers, developers only have to modify or add a specific layer, rather than have to rewrite the entire application over. There should be a presentation tier, a business or data access tier, and a data tier . . . [A] layer is a logical structuring mechanism for the elements that make up the software solution, while a tier is a physical structuring mechanism for the system infrastructure.

"Three-tier architecture . . . is a client-server architecture in which the user interface, functional process logic ("business rules"), computer data storage and data access are developed and maintained as independent modules, most often on separate platforms . . . [T]he three-tier architecture is intended to allow any of the three tiers to be upgraded or replaced independently as requirements or technology change. For example, a change of operating system in the presentation tier would only affect the user interface code."

BSM, according to Wikipedia, includes "a set of management software tools, processes and methods to manage IT (information technology)" that are designed to help an IT computerized system within a computerized organization support and maintain the main services that the IT computerized system provides to the computerized organization it is servicing.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a system and method for generating and utilizing application structure based on skeleton-based discovery and re-discovery in which, whether or not top-down discovery is executed initially, a skeleton is generated including only a tier topology and not including instance topology inside each tier since instance topologies inside individual tiers can change within minutes in "cloud" computing environments. Re-discovery (updates of the discovery process) are then quick enough to be effected frequently, simply by filling in the absent parts of the skeleton, typically including filling in missing instance topologies inside individual tiers. However, if it turns out that the skeleton is out of date, e.g., because the tier topology has been changed (e.g., a tier has been added or removed), the initial discovery is typically redone.

Certain embodiments of the present invention seek to provide a System and Method for Generating and Utilizing Application Structure Based on Top-Down and/or Skeleton-Based Discovery and Re-Discovery. The system and method are particularly suited, inter alia, for multi-tier architecture applications. Multi-tier architecture is advantageous because the separation of the application into tiers can lead to better scalability, as a tier can often be built as a cluster of servers, with the ability to increase or decrease the cluster size depending on usage demand.

Certain embodiments of the present invention seek to provide a method for prioritizing information technology servicing in terms of priorities of the computerized organization rather than, or rather than solely, in terms of infrastructure level-expressed priorities. For example, the method may be constructed and operative to give more priority to an application that is important for the organization, rather than to some server or disk or network device, based on a representation of the applications and a mapping to actual resources used by these applications, which typically comprises a dynamic mapping since such resources may vary over time, e.g., in cloud computing applications.

Certain embodiments of the present invention seek to provide an information technology supporting system suitable for dynamic "cloud" environments and data centers with virtualization features; typically including real time mapping of applications, servers, network and storage elements to business services; and/or dependency detection, and/or dynamic adaptation to changes in IT infrastructure without human intervention.

Certain embodiments of the present invention seek to provide top-down discovery of applications in a computerized organization or "business", also known as "business services". Conventional systems perform bottom-up discovery by identifying all infrastructure elements, e.g., servers, storage elements, network elements, in an organization (or as many as is practical). Next, a repository of all elements thus identified is built. Dependencies between all elements in the repository may then be found. The dependencies may then be utilized to determine which infrastructure elements belong to a single business service or application, e.g., through a manual definition process. In contrast, in top-down discovery, a single entry point (typically not more) identifies a relevant process and an application with which that entry point is associated. Typically, it is sufficient for the entry point to be associated with a host name or IP address and port numbers; in some applications, the entry point may best be associated with a URL. Typically, discovery starts from the entry point to each of one or more software applications of interest to the computerized organization. Methods shown and described herein discover only the part of the application that starts at the entry point, so typically, the entry point is best defined as the beginning of the application. Dependencies between each individual infrastructure element associated with an entry point and other infrastructure elements are then found recursively, until all infrastructure elements serving a software application of interest have been identified and a topology defining dependencies there between has been identified.

Certain embodiments of the present invention seek to provide a method for using a skeleton, including only a partial set of knowledge about an application's topology, in order to perform fast, frequent re-discovery and/or to employ real-time policies, which may be based on results of the fast, frequent re-discovery.

Uses for top-down discovery include but are not limited to:
1. Automated process for determining the structure of an application, including its components and dependencies between them.
2. Showing the impact of status changes such as server failure, out of space on a storage device, or port down on a network device on actual applications, e.g., as a result of events or notifications received from external systems such as monitoring systems, wherein the impact is applied to particular entities such as but not limited to applicative components, network elements and servers (network endpoints) known to be associated with an affected application.

Certain embodiments of the present invention seek to provide a discovery process, including starting from an entry point to an individual application and running through relevant patterns one by one, for each pattern checking its identification section until a match is found enabling entity identification, then running that pattern's connection sections to find all the subsequent connections and continuing recursively until all entities have been found and identified and a complete topology of the application has been determined.

Certain embodiments of the present invention seek to provide "skeleton-based discovery", which may or may not be top-down.

It is appreciated that analysis of a complex computerized enterprise data center to determine the structure thereof is particularly useful for maintenance of the complex computerized enterprise. This is because individual elements not infrequently go out of order, causing a large number of calls to the information technology maintenance team in the enterprise. It is advantageous to prioritize these calls, rather than handling them in random or first-in-first-out order. If the structure of the applications in the enterprise data center is known, prioritization of elements can be defined, e.g., by combining (using a maximum, average or other suitable formula) the importance of all applications affected by, i.e., utilizing, each particular element that is down. Also, replacement fixes can be implemented by temporarily assigning a replacement element to affected applications. Structure determination is also useful for servicing an enterprise application. For example, if a servicing operation involves disconnecting a particular element that has an impact on one or more critical applications, that servicing may be scheduled accordingly, e.g., at night or a replacement element may be temporarily assigned to the affected critical applications.

Uses for skeleton-based discovery include but are not limited to:
1. Quick re-discovery based on the skeleton.
2. Application of policies at the skeleton level.
1. Quick re-discovery based on the skeleton typically comprises re-use of information that was found during the initial discovery, such as but not limited to the applicative components involved and/or their versions and/or configuration files.

Conventionally, a method scans upon occasion through all elements of, typically, less than all of the applications in a data center and determines what has changed. In each such scan, the method typically gathers all information from scratch, including but not limited to characterizations of the operating system, the processes running, and patches which may have been installed. According to certain embodiments of the invention, the elements in an organization's data center are initially discovered and a "skeleton" is stored, e.g., in a database. The data center is then fairly frequently re-discovered (re-scanned), perhaps every few minutes, e.g., 10 minutes, or every few hours, e.g., 5 hours, taking into account the already generated skeleton. This is advantageous because it is safe to assume that in the next scan in, say, 10 minutes, if the structure previously included, say, Websphere application servers running on top of Linux, then this will still be the case 8 minutes or 3 hours later. In contrast, one cannot assume that there will be only 3 instances of the above servers, due to frequent re-allocation of instances in the new dynamic cloud data center. Therefore it may be useful to frequently check if any instances were added or removed to/from a cluster or whether a certain virtual server moved to a different physical server.

Conventionally scans of an entire data center are extremely time-consuming and are therefore performed infrequently (e.g., once a day). This is because an organization may have thousands or tens of thousands or even millions of elements. Of these, only some are deemed "important" because only elements in "important" applications are typically deemed important. Typically, between 10 and a few hundred applications are deemed important; hence, dozens or a few hundred of the elements are deemed important. Therefore, scanning only important applications may become a necessity in conventional set-ups, because this requires a few orders of magnitude and fewer resources than scanning everything. Consequently, "less important" applications are typically completely neglected.

In contrast, skeleton-based discovery as shown and described herein is suited for real time and dynamic environments in which, say, a load balancer, which used to be responsible for load balancing between a first number, say 3, applicative components such as application servers, suddenly finds itself load balancing between a second, larger, number of such, say 4, perhaps because a new application server was deployed in the organization and this load balancer was configured to use the new, fourth server as well. Conventional data center scans will only detect such a change the next time they do a whole infrastructure scan again, which can be very infrequent. Typically, such scans are so cumbersome that they are performed no more than once per day and sometimes even less frequently. In contrast, skeleton-based discovery involves a fast rescan, which finds changes almost in real time and is fast enough to be performed as often as every few minutes, perhaps 15 minutes.

2. Application of policies at the skeleton level—policies such as limitations on number of elements/instances in a tier, various KPIs (key performance indicators), such as but not limited to CPU utilization at the tier level and/or impact. Typically, such policy management refers to and is associated in computer memory, with logical elements (e.g., a "tier") of each application rather than only to specific instances of such logical elements.

At least the following embodiments are described herein, using terminology defined later herein:
1. A discovery method comprising at least some of the following steps:
For an entry point, an initial connection is created according to the entry point type.
Iterate at least some of the following steps until no unresolved connections exist:

If a hostname is defined in the entry point (as opposed to an IP address), then perform DNS lookup for the hostname. If the hostname is resolved to multiple IP addresses, then create a cluster object with the connection as its input, and outgoing connections per each resolved IP address with the same entry point values, except replacing the hostname with the relevant IP address.

Look up NAT and other network devices along the way to see if the provided entry point is affected by such a device (e.g., if the entry point is really a virtual address/port on a network device that is mapped to a different address/port). If yes, then a new connection needs to be created with the entry point information mapped after the network address translation.

Check if OS discovery for the target computer pointed to by the entry point has not been performed yet (i.e., the computer was never discovered); if so, then run OS discovery for this target host.

Identify the relevant process running on the host, e.g., by checking which process is listening on the port that defines the entry point. Get the attributes of the relevant process, such as but not limited to the directory it is running in and/or the command line attributes it was run with.

Identify all discovery patterns that match the connection's entry point type and fulfill the pre-requisite condition for these patterns (e.g., they match the operating system of the target host). Execute all of these discovery patterns, one after the other and stop as soon as one discovery pattern succeeds in discovering and creating a CI object.

For the newly created CI object, run all of its deterministic connection pattern sections, and for each discovered connection, create a connection object.

If possible, reconcile newly created objects with existing objects in the topology database.

2. Skeleton data apparatus including information needed for quicker later re-discovery of the business service, including some or all of:

NAT and other network devices along the path that affect the application flow and the address translation applicable to each of them A template for the application topology including division into tiers and application flows between tiers. This application template may be deduced from the application topology discovered in the initial discovery with the following differences:

Discovered clusters of CIs may be replaced with a generic cluster placeholder to accommodate changes within a cluster without affecting the skeleton.

Host information for CIs may not be stored in the skeleton, i.e., only the applicative CIs may be stored. This allows applications to move between hosts without this being considered a skeleton change.

For each tier & CI, the discovery pattern and the identification section inside it that were used to discover it (so they don't have to be determined again/

A re-discovery frequency per tier as one of: high/medium/low (the exact frequency in minutes per each category may be user defined in the administrative preferences).

Credentials used per each identified CI. Note: this is the only skeleton component that is stored per identified CI and not per tier.

Impact rules describing how events should be propagated along the application structure (an example for such a rule: "if 30% of cluster members are down, mark the application as yellow. If 50% are down, mark it as red").

Manually defined discovery refinements out of the following types:
  Manually added connections
  Manually added entry points to the application
  CI tiers and/or connections marked as application boundary and that should not be followed 3. A method for skeleton-based re-discovery including some or all of:

Traversal of the application skeleton that was previously generated

For each skeleton connection a discovery task is created with information that was stored in the skeleton. The information typically includes at least some of: the pattern that needs to be executed, credentials that should be used, and the frequency with which this task needs to be performed.

Each task is performed (given its frequency) and the result is used to update the topology of the application in case changes are detected.

If failures are detected or new information is discovered that is inconsistent with that stored in the skeleton (e.g., a connection in the skeleton points to a WebSphere component, but it is no longer possible to discover a WebSphere component there), then the skeleton is marked as invalid and an Initial Discovery process is re-initiated (at least on this particular part of the application).

It is appreciated that there may be a separate independent computerized process which scans the network horizontally to identify NAT, firewall and load balancer devices and/or a user may provide a list of such devices to the system, e.g. as shown in FIG. 2, step 180.

Also provided is a method for maintaining a population of applications, including performing at least one computerized operation on the population of applications, the method comprising:
  creating an application skeleton, based on an application topology as discovered; and
  treating a group of CIs as one with regard to at least one computerized operation.

The computerized operation may comprise at least one of the following: monitoring of applications; real-time discovery of applications; and performing impact analysis of applications.

"As one" means that a single node in the graph representing an application represents a plurality of actual nodes (entities, represented in the full graph by a node). For example, if the user has an application that uses 10 computers, and those 10 computers are performing the exact same role, any one of them being interchangeable with the other of them, only one skeleton node may be placed in the graph, that represents all 10. If it is discovered that a computer in this cluster of 10 computers was added or removed, 1 skeleton node for all N nodes would still be maintained. Monitoring is an example of a task performed using skeleton nodes. If a monitoring task is configured on a Skeleton node, the task is run on all actual nodes that the skeleton node represents.

There is thus provided, in accordance with at least one embodiment of the present invention, a computerized method for determining a structure of at least one application in a computerized organization, the method comprising receiving at least one entry point including an identification of a virtual location on a computer network; for each entry point, receiving a determination of an individual applicative component that processes data arriving through that entry point; identifying at least some communicating entry points through which the first applicative component communicates with additional applicative components; and for each of the at least some communicating entry points, using a processor for determining the applicative component that processes data arriving through that communicating entry point; and providing at least a portion of a structure including: applicative components associated with the application and information with regard to which of the applicative component communicates with which.

Further in accordance with at least one embodiment of the present invention, the computerized organization resides on an organizational computer network and wherein at least one entry point includes an identification of a virtual location on the organizational computer network.

Still further in accordance with at least one embodiment of the present invention, receiving a determination comprises determining an individual applicative component that processes data arriving through that entry point.

Additionally in accordance with at least one embodiment of the present invention, identifying comprises identifying all communicating entry points through which the first applicative component communicates with additional applicative components.

Further in accordance with at least one embodiment of the present invention, the method also comprises repeating the identifying and the receiving of a determination, at least once, to identify further communicating entry points for applicative components determined thus far and to determine further applicative components that process data arriving through the further communicating entry points.

Further in accordance with at least one embodiment of the present invention, the identifying and the receiving of a determination are repeated until no further communicating entry points can be identified and no further applicative components can be identified.

Still further in accordance with at least one embodiment of the present invention, identification of applicative components that process data that ultimately arrived from an individual entry point is conducted depth-first.

Additionally in accordance with at least one embodiment of the present invention, identification of applicative components that process data that ultimately arrived from an individual entry point is conducted breadth-first.

Further in accordance with at least one embodiment of the present invention, the method also comprises using the structure to perform at least one computerized organization maintenance operation on at least one application.

Additionally in accordance with at least one embodiment of the present invention, the computerized organization maintenance operation comprises impact management.

Further in accordance with at least one embodiment of the present invention, the at least one application includes a plurality of applications and wherein the method also comprises generating a knowledge base storing information regarding respective structures of the plurality of applications.

Still further in accordance with at least one embodiment of the present invention, the method also comprises using the structure to prioritize calls to a computerized organization maintenance facility including using the structure to identify applications whose components are down, establishing priorities between the applications and sequencing repair of components that are down, depending on the priorities.

Additionally in accordance with at least one embodiment of the present invention, the method also comprises using the structure to prioritize calls to a computerized organization maintenance facility including using the structure to identify applications whose applicative components are down, establishing priorities between the applications and temporarily replacing at least some components that are down with other components, depending on the priorities.

Further in accordance with at least one embodiment of the present invention, the method also comprises using the structure to schedule non-emergency maintenance including using the structure to identify maintenance-affected applications whose components are expected to be non-operational during the maintenance and scheduling the non-emergency maintenance at selected hours depending on the importance of the maintenance-affected applications.

Still further in accordance with at least one embodiment of the present invention, the method also comprises using the structure to identify maintenance-affected applications whose components are expected to be non-operational during routine maintenance and compensating the maintenance-affected applications by temporarily replacing the components that are expected to be non-operational during routine maintenance.

Further in accordance with at least one embodiment of the present invention, the organization includes a multiplicity of applications and wherein the method also comprises using the structure to re-discover only a selected subset of applications that are of interest, from among the multiplicity of applications, rather than re-determining the structures of all of the multiplicity of applications of which many are not of interest.

Still further in accordance with at least one embodiment of the present invention, at least one determining step for at least one entry point comprises finding a unique characteristic of an applicative component.

Additionally in accordance with at least one embodiment of the present invention, the unique characteristic includes at least one of a Process name, and a configuration file characteristic.

Further in accordance with at least one embodiment of the present invention, the providing at least a portion of a structure comprises storing the portion in a computer storage device.

Also provided, in accordance with at least one embodiment of the present invention, is a computerized re-discovery method for a computerized organization including a multiplicity of applications, the method comprising using a processor for determining a structure of at least one application in the computerized organization; and using the structure to re-discover only a selected subset of applications that are of interest from among the multiplicity of applications, rather than re-determining the structures of all of the multiplicity of applications of which many are not of interest.

Also provided, in accordance with an embodiment of the present invention, is a computerized re-discovery system for a computerized organization including a multiplicity of applications, the system comprising apparatus for determining a structure of at least one application in the computerized organization; and re-discovery apparatus employing a processor for using the structure to re-discover only a selected subset of applications that are of interest, from among the multiplicity of applications, rather than re-determining the structures of all of the multiplicity of applications of which many are not of interest.

Additionally provided, in accordance with at least one embodiment of the present invention, is a computerized system for determining a structure of at least one application in a computerized organization, the system comprising a recursive entry point identifier operative, for each entry point from among at least one entry point including an identification of a virtual location on a computer network, for receiving a determination of an individual applicative component that processes data arriving through that entry point and for identifying at least some communicating entry points through which the first applicative component communicates with additional applicative components; and a structure generator operative, for each of the at least some communicating entry points, to use a processor for determining the applicative component that processes data arriving through that communicating entry point; and for providing at least a portion of a structure including applicative components associated with the application and information with regard to which of the applicative component communicates with which.

Yet further in accordance with at least one embodiment of the present invention, using the structure to re-discover does not start from a "root" entry point and instead starts from a location in the structure that is a starting point to a portion of the structure that it is desired to re-discover.

Also provided, in accordance with at least one embodiment of the present invention, is a computer program product, comprising a computer usable medium having a computer readable program code embodied therein, the computer readable program code adapted to be executed to implement a computerized method for determining a structure of at least one application in a computerized organization, the method comprising receiving at least one entry point including an identification of a virtual location on a computer network; for each entry point, receiving a determination of an individual applicative component that processes data arriving through that entry point; identifying at least some communicating entry points through which the first applicative component communicates with additional applicative components; and, for each of the at least some communicating entry points, using a processor for determining the applicative component that processes data arriving through that communicating entry point; and providing at least a portion of a structure including: applicative components associated with the application and information with regard to which of the applicative component communicates with which.

Still further provided in accordance with at least one embodiment of the present invention, is a computer program product, comprising a computer usable medium having a computer readable program code embodied therein, the computer readable program code adapted to be executed to implement a computerized re-discovery method for a computerized organization including a multiplicity of applications, the method comprising: using a processor for determining a structure of at least one application in the computerized organization; and using the structure to re-discover only a selected subset of applications that are of interest, from among the multiplicity of applications, rather than re-determining the structures of all of the multiplicity of applications of which many are not of interest.

Additionally provided, in accordance with at least one embodiment of the present invention, is a computerized method for storing a representation of at least one application in a computerized organization, the method comprising determining a structure of at least one application in a computerized organization; and using a process for generating, and storing, a skeleton characterization of the structure of the application including storing information regarding at least one applicative component identified that is considered stable over time and not storing information regarding at least one applicative component identified that is considered unstable over time.

Also provided is a computer program product, comprising a typically non-transitory computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display, e.g., on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g., electronic, phenomena, which may occur or reside, e.g., within registers and/or memories of a computer. The term processor includes a single processing unit or a plurality of distributed or remote such units.

The above devices may communicate via any conventional wired or wireless digital communication means, e.g., via a wired or cellular telephone network or a computer network such as the Internet.

The apparatus of the present invention may include, according to certain embodiments of the invention, machine readable memory containing or otherwise storing a program of instructions, which, when executed by the machine, implements some or all of the apparatus, methods, features and functionalities of the invention shown and described herein. Alternatively or in addition, the apparatus of the present invention may include, according to certain embodiments of the invention, a program as above, which may be written in any conventional programming language, and optionally a machine for executing the program, such as but not limited to a general purpose computer, which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", or the like, refers to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g., digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein, e.g., by providing one or more modules in the processor to perform functionalities described herein. Any suitable computerized data storage, e.g., computer memory, may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 1 is a simplified top-level flowchart illustration of a computerized organization maintenance method constructed and operative in accordance with certain embodiments of the present invention.

FIGS. 2a-2c, taken together, form a simplified top-level flowchart illustration of a top-down Initial discovery method constructed and operative in accordance with certain embodiments of the present invention.

FIG. 4 is a simplified top-level flowchart illustration of a method for deriving a skeleton of an application, the method being constructed and operative in accordance with certain embodiments of the present invention; the method also being useful for updating an existing skeleton after re-discovery, if the skeleton is deemed "invalid" as a result of some discovered change in the topology of an application, e.g., after full re-discovery is done.

FIG. 7 is a simplified top-level flowchart illustration of a skeleton-based discovery method constructed and operative in accordance with certain embodiments of the present invention.

FIG. 8 is a simplified top-level flowchart illustration of a method for skeleton-based re-discovery executed for an entire application, the method being constructed and operative in accordance with certain embodiments of the present invention.

FIG. 9 is a simplified top-level flowchart illustration of a method for generation of impact tree from an application skeleton, including, typically, computation of an impact tree each time there is a change, the method being constructed and operative in accordance with certain embodiments of the present invention.

FIG. 10 is a simplified flowchart illustration of an impact management method constructed and operative in accordance with certain embodiments of the present invention, the method including generating an output, e.g., display, which shows the impact of events and changes applied to applicative components, network elements, servers, or other entities, on applications that use them. The method of FIG. 10 is useful, e.g., in conjunction with the top-down discovery method of FIGS. 2a-2c, the method including generating an output, e.g., display, which shows the impact of events and changes applied to applicative components, network elements, servers, or other entities, on applications that use them. The method of FIG. 10 may be applied to an impact tree computed based on a skeleton whose generation is as shown and described herein.

Figure 3:
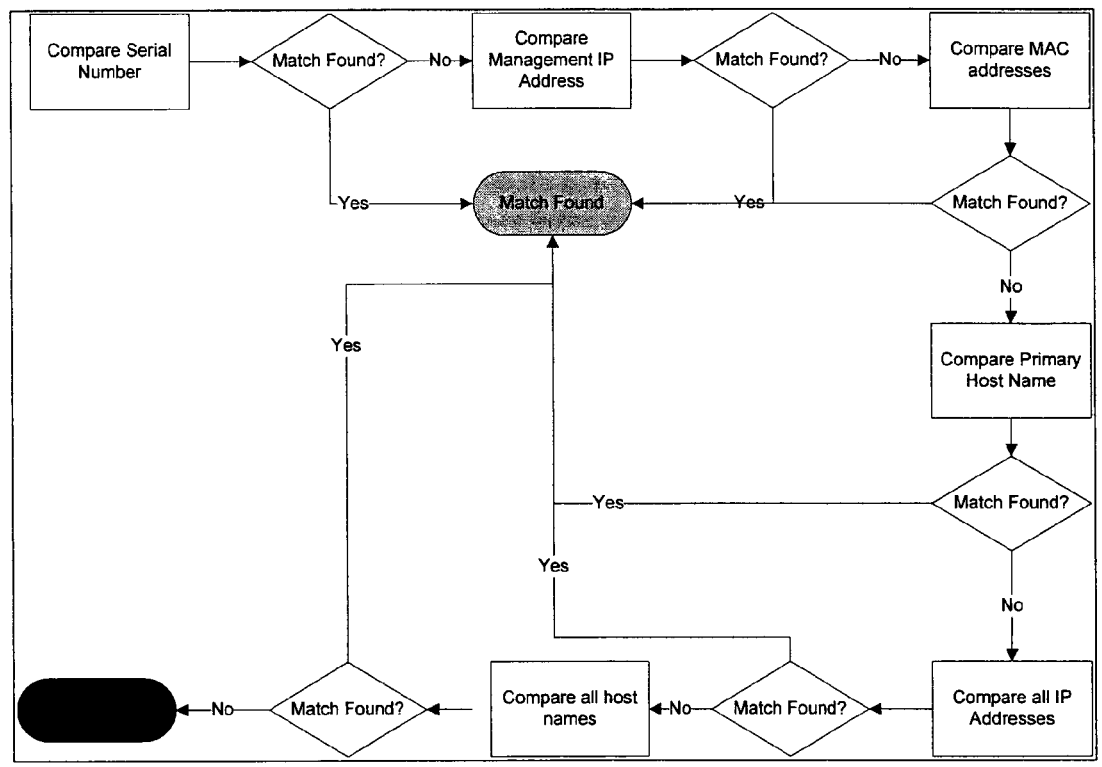
FIG. 3 is a simplified top-level flowchart illustration of an example identity matching process constructed and operative in accordance with certain embodiments of the present invention, the method including checking at least one and typically a plurality of attributes of an element typically in some predefined order; for example, as shown, for identifying a host, the method may first look for a match of the serial number, then look for a match of the host name and then of the primary IP address.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus that is primary, secondary, tertiary or off-line; that is of any type or level or amount or category of volatility, differentiation, mutability, accessibility, addressability, capacity, performance and energy use; and that is based on any suitable technologies such as semiconductor, magnetic, optical, paper and others.

DETAILED DESCRIPTION OF CERTAIN EMBODIMENTS

The following terms may be construed either in accordance with any definition thereof appearing in the prior art literature or in accordance with the specification, or as follows:

Application: A software application including multiple applicative components overall providing a certain service to the organization.

Applicative component (of a software application): A software module, which includes a meaningful subset of the lines of code forming the software application or includes lines of code that are called by the software application so as to provide that application with some service. Typically, the module includes one or more executable processes, along with a configuration file defining the configuration of the software module and, optionally, other supporting files such as but not limited to a database, temporary files, or default values. Typical applicative components include but are not limited to databases (such as but not limited to Oracle, Sybase, DB2), application servers (such as but not limited to Websphere Application Server, WebLogic), Web servers (such as but not limited to Apache, IIS), Directory servers, message buses, and load balancers. A single applicative component may serve multiple applications. It is appreciated that more than one applicative component, perhaps even serving more than one respective application, may reside on the same physical server or even virtual server. The term "Applicative" pertains to software; applicative CIs may be hosted on other elements such as servers. An applicative entity comprises a piece of software that runs on one or more servers, either virtual or physical.

Business Service or Service: see Application

Business service modeling: see Discovery

Collector: a logical entity used to communicate with target hosts using various management protocols such as but not limited to WMI, SSH, and SNMP. There could be multiple collectors in a single system. Collectors can reside on a separate host or may be co-located with one another and/or with the main system server. Different collectors can be responsible for different target hosts, respectively, or there could be overlap such that more than one collector is responsible for at least one of the target hosts.

Cluster, cluster object: Computer cluster (not "data cluster"). Wikipedia describes that "A computer cluster is a group of linked computers, working together closely thus in many respects forming a single computer. The components of a cluster are commonly, but not always, connected to each other through fast local area networks. Clusters are usually deployed to improve performance and availability over that of a single computer, while typically being much more cost-effective than single computers of comparable speed or availability. Clusters may include High-availability (HA) clusters, Load-balanced clusters and Compute clusters.

Collector: Distributed logical entity used to communicate with target hosts. The collector may perform OS discovery on given hosts and may use standard protocols such as but not limited to WMI, SNMP and ssh to collect suitable information e.g. as described herein, from target hosts. The collector is typically operative to communicate with a group of target hosts and to perform tasks handed to it by a centralized server.

Component: See element.

Configuration Item (CI): A CI according to one embodiment is synonymous with "element" as described herein. A CI according to another embodiment is an entity describing a component, e.g., physical server, load balancer, applicative component, which is part of an application. There are physical CIs (network devices, hosts, and other hardware components supporting an application) and applicative CIs (application servers, databases, and other software components of an application).

Connections: see Dependencies

Credentials or Discovery Credentials: Credentials used during a discovery process to access a target server/element. In most cases credentials include a user name and password used to access the target server/element. Sometimes a certificate (such as defined by standard X.511) is used to grant access to a certain resource (e.g., using the ssh protocol).

Data center: Location at which many or most of an enterprise's servers and applications are installed and maintained. An enterprise may use multiple data centers for redundancy or geographic proximity. Data centers may contain from many dozens to hundreds of thousands, or more, of physical servers.

Dependencies: An enterprise's software applications often each include a multiplicity of applicative components. An individual applicative component may communicate with multiple other applicative components, in which case the individual applicative component is deemed to have "dependencies" to all of the multiple other applicative components.

Example: The front end Web server of an application usually communicates with one or more application servers. Some or all of the application servers may communicate with a database (to store and retrieve data), with a directory server (e.g., to authenticate a user) and/or with other servers. A database can feed a reporting component. In this example, there are dependencies: (a) between the front end Web server and each of the one or more application servers; (b) between each application server and the database and/or directory server and/or other server/s with which that application server communicates; and (c) between databases and reporting components fed thereby.

Discovery or Application discovery: The process of identifying a structure, also termed herein "topology", of an application including the applicative components it is composed of and the dependencies between them. "Discovering entities" refers to using a knowledge base of patterns to identify applicative entities comprising the application and connections therebetween.

Discovery task: A set of instructions handed to a collector asking it to discover certain information about a target host. The collector typically performs the discovery task and then returns the discovery results to a main server for consolidation and further processing.

DNS (domain name system) server: A server that facilitates translation of host names to IP addresses, e.g., using conventional domain name system schemes.

Element: A single entity in the application topology. This may for example comprise an applicative component such as a database or load balancer or application server, a server (virtual or physical) or a network device. An organization may have thousands or tens of thousands or even millions of elements. Each application in the organization is typically served by between a few to many dozens of elements. One example of an element is a configuration item as defined herein.

Enterprise: Computerized organization employing many applications, each of which utilizes many computerized entities.

Entity: See Element.

Entry Point: A set of parameters such as but not limited to host, protocol, port, URL, that indicates a location of an application on an organization's computer network and, optionally, its unique usage by a particular application; this location is also where to start discovering the application from, according to certain embodiments. The entry point may for example include a name or IP address of a host, and a port number identifying one of the host's ports. In a WEB application the entry point typically comprises a URL or more generally a unique address of a resource, which is accessible through a computer network such as the Internet. In an application that is not a web application, the entry point may, for example, be identified by the IP address and the port number on which the application is accessed.

If a WEB application actually serves multiple distinct applications (e.g., both an "order entry" application and "account receivables" application), additional parameters can be provided as part of the entry point; e.g., in the WEB application case, the complete URL can serve to determine a particular "war file" used within the application server; a war file is typically used to package the logic of a specific application and may have its own configuration files and parameters.

Graph: A topological representation of known elements in an application, including nodes and edges, each node representing an element discovered in the application, each edge representing a connection or dependency between discovered nodes/elements.

Identification Logic: A section within a pattern which, when executed, identifies which specific applicative component is used. The "logic" can use the process name or various other parameters to check whether the process can be identified. For example, the logic can access the process listening on the TCP port number provided as part of the entry point, check its name and command line parameters, and perform other suitable local commands to determine which applicative component it is. For example, many applications provide command line tools that may be used to extract various configuration parameters such as but not limited to application version, and installation options.

Identity matching: Checking, e.g., using comparisons, whether or not a current entity, e.g., a server, may have already been discovered previously and may already be in the topology database or skeleton of an application, in which case the existing entity in the topology may be used to represent the entity, e.g., server, rather than creating a duplicate node in the database.

Impact: each element in the topology of an application may have a severity status indicator of its current health, such as one of: "Healthy", "Warning", "Major", "Error", which typically corresponds, respectively, to good functioning, slightly impaired functioning, seriously impaired functioning and non-functioning. By default the status may be healthy but this typically changes, e.g., when an event is received (e.g., from some external monitoring system) indicating a different status. In addition, an element in the application topology can have an impact on elements depending on or connected to that element; e.g., in the case of a WEB application, if the database element is not functioning (e.g. "Error" state), then the application server might not function either ("Error"). If one of the application servers in a cluster is not functioning ("Error"), then the entire application might suffer from performance issues ("Major" or "Warning" depending on how many other functioning servers remain in the cluster). "Impact" describes the effect of one element on the elements connected to it and can propagate, typically via impact rules, from one element to elements connected to that element and so on, from element to element. Impact rules define how an individual element's status transitions depending on the status of other elements that this individual element depends on. The final status of an element may be the more severe state from among: (a) its own state and (b) the state computed from some or all of its descendants, e.g., its children only, using the impact rules.

Impact tree: Set of rules defining how impact status propagates from one entity in an application topology to elements depending on that entity, and so on, eventually reaching the root of the tree, which typically comprises the entry point to the application. The final outcome of the impact tree typically comprises a status for each individual element in the relevant application topology, which status is computed based on the status of all "child" elements on which the individual element depends, and its own state, e.g., as received through incoming alerts. The root of the tree, i.e., the entry point, computes the status of the application itself.

Instances within tier: Element/entity/component currently residing within or belonging to a tier.

Knowledge base: A collection of Patterns, one per known applicative component type. May be used to identify the various components of an application and the relations between them.

Model: Topology of an application. For example, a simple web application may include a load balancer, then multiple web servers (e.g., Apache) then a cluster of application servers (e.g., Websphere), then some database (say Oracle). The topology is generally represented as a graph in which the elements are nodes in the graph, and dependencies therebetween are directional edges in the graph.

Modelling or model discovery: See Discovery.

NAT: Modification of IP address information in IP packet headers while in transit across a network traffic routing device. The function is typically carried by suitable network devices such as firewalls or router. In a simple form of NAT, one IP address is simply replaced by another. Some NAT methods also modify the port number field in IP packets, typically in order to hide an entire IP address space, usually consisting of private IP addresses, behind a single IP address (or in some cases a small group of IP addresses) in another (usually globally routable) address space.

Orchestrator: a main server in the system, used to orchestrate the application discovery process including some or all of: distributing discovery tasks to multiple collectors, collecting back discovery results from the collectors, consolidating the results and storing them in the database, employing suitable business logic if and as appropriate depending on the application, computation of impact trees and providing data to be used for the UI (user interface) and/or presentation layer.

OS Discovery: The process of identifying the type of a certain element (e.g., server running Windows vs. server running Linux vs. network device running some other OS) and fetching basic attributes of that element such as but not limited to one or more of OS version, network interfaces cards (NICs), and IP addresses thereof.

Pattern: A piece of logic that typically stipulates how to identify a certain type of entity. Such logic typically comprises a set of computer-executable rules stipulating that under certain conditions, the entity is of such and such a type. The logic of each pattern may be written in any suitable existing or special-purpose computer language. Typically, each pattern includes an application-specific set of rules for identifying a particular application and the connections from that application to other applications.

Pattern Connection Section: A portion of a pattern that describes how to locate connections from the pattern's entity to other entities, e.g., by extracting relevant information, including dependent entities and entry points thereof, from at least the configuration files and/or the registry.

Pattern Identification Section: A portion of a pattern, typically including a set of rules and conditions, which is operative to identify an entity. This would typically take into account at least the process name and methods (either or both) to extract the version information.

Physical: Pertaining to hardware including but not limited to hosts and network devices.

Process: An applicative component executable running on the target host.

Relations or Relationships: See Dependencies.

Scanning: Checking which protocols are supported on a host, e.g., some or all of: does the host reply to SNMP requests, does it reply to WMI requests, and/or does it accept ssh sessions. Using any conventional scanning methodology such as conventional nmap technology.

Server: Unless otherwise indicated, this term is used herein to denote either a physical server or a virtual server.

Connection category and type: Connections in the application structure can be of multiple categories such as but not limited to some or all of the following: The "Application Flow" category may be used to connect from one applicative component to another component that it communicates with e.g. using a suitable network protocol such as but not limited to HTTP or SQL. In this case the connection type may indicate the protocol used, and additional parameters may be provided accordingly. For example, in the case of HTTP the connection may also indicate the URL by which the first component communicates with the second one. The "Cluster" category may be used to designate a connection from a component to a cluster element. The cluster element would then be connected, e.g. using an "Application Flow" connection as described herein, with the individual members of the cluster. Another possible connection category is "Inclusion" which may be used internally by the system to indicate a connection from an applicative component to some internal components of the applicative component. For example, a Websphere application server may contain multiple sub-applications, each packaged as a WAR file. Each of these sub-applications may be identified as separate applicative components and in a certain application that uses the Websphere component, it may be desired to connect the Websphere to its relevant sub-application (WAR file) used by the application. This may be done using an Inclusion connection.

Skeleton or "application skeleton": A representation of the structure of an application including only a portion of the full information regarding application structure, which is stored, e.g., as a cache, to enable frequent, fast and efficient re-discovery by avoiding the need to re-discover attributes that are less likely to change hence deemed stable (e.g., tiers and relationships therebetween, version of an applicative component) while scanning more frequently changing items (e.g., the elements in a cluster, instances of applicative components within tiers). For example, an application may include a number of tiers or layers. In each tier there may be more than one "instance" of applicative components (in a certain application, an "application server" tier may include 5 Websphere-type application servers and a "database tier" may include a cluster of 3 database servers). The skeleton may then include an indication of: tier of application servers, type=WAS (IBM term for Websphere application servers) because this is expected to be stable over a period of days, weeks, months or years. The skeleton may not include other information present within the discovered structure, such as the IP addresses and other particulars of the instances of the above tier, because one cannot assume that the number of instances of the above, say, servers, will remain constant even after a few minutes or hours, due to frequent re-allocation of instances in new dynamic cloud data centers.

According to certain embodiments, a skeleton may include:
a. A template for the application topology including division into tiers and application flows between tiers; and/or
b. NAT and/or other network devices along the path that affect the application flow and the address translation applicable to each of them.

Example: A skeleton generating process may deem as stable, hence include in the skeleton, a cluster of entities and may deem as unstable, hence not include in the skeleton, some or all members of the cluster which are expected to change once or several or many times during the lifetime of the cluster. This is advantageous because typically, rediscovery only needs to find the current cluster members and does not have to re-verify that the cluster is indeed a cluster, nor does the rediscovery need to re-perform other discovery tasks such as determining the type and/or version of each cluster member.

Stable: An applicative component is considered stable over time, inter alia, if it is likely to remain part of the application at its present location in the application topology over a long period of time such as weeks, months or years, whereas an applicative component is considered unstable over time if it is likely to remain part of the application at its present location in the application topology for a period of time that is significantly, say, at least an order of magnitude, shorter than the above long period of time, e.g., at most a few minutes or hours or days. For example, a tier may be stable over time whereas individual instances within the tier may be unstable over time.

Structure of an application: See Model.

Tier: Within a multitier architecture. Typically although not necessarily, a tier is a collection of CI's of the same type, which are either clustered together or are accessible through a common element such a load balancer. An example of a tier is a plurality of hosts used as a single host, e.g., such that multiple instances of a database may be run on separate hosts clustered together as a single tier.

Top-down discovery: Discovery of an application starting from an entry point into the application, which identifies how an application is consumed, and advancing from the entry point, element by element (also termed herein "hop by hop"), thereby to identify all applicative components composing the application. Typically, in each element, at least one dependent applicative component, if such exists, is identified and the entry point into that applicative component is found. Then, in subsequent respective elements, each such applicative component is respectively used to recursively find additional applicative components dependent on each such applicative component. Reference is made to FIG. 1 which is a simplified top-level flowchart illustration of a computerized organization maintenance method constructed and operative in accordance with certain embodiments of the present invention. The method of FIG. 1 typically comprises some or all of the following steps, suitably ordered, e.g., as shown:

Step 10: Initial discovery (skeleton-based and/or top-down), e.g., as per FIGS. 2a-2c.

Step 20: store structure as discovered.

Step 30: Use structure: To prioritize calls to IT department or to compensate "stricken" applications by identifying and replacing elements causing the call; and/or to schedule non-emergency maintenance or to identify and "compensate" maintenance-affected applications by temporarily substituting maintenance-disabled elements used by these applications Step 40: Optional: Derive skeleton from structure stored in operation 20, e.g., as per FIG. 4.

Step 50: Periodically re-discover structure including storing updated structure accordingly. Optional: using skeleton, e.g., as per FIG. 8, in which case re-discovery includes updating skeleton of step 40; store updated structure if skeleton is found to be unchanged; else identify portion of application for which initial discovery is to be repeated; repeat initial discovery (e.g., using FIGS. 2a-2c) for that portion only; combine structure of other portions with new structure of portion for which initial discovery was repeated, and derive new skeleton from combined structure (e.g., using FIG. 4).

Step 60: Accepting events/alerts (e.g. directly from elements, or from external monitoring systems), associating the events/alerts with appropriate elements and computing impact on applications those elements belong to using an impact tree which is part of the skeleton.

Regarding FIG. 1, step 50, re-discovery of only a portion of an application typically occurs as a result of different discovery frequencies or schedules for different parts of the application—in such a case, re-discovery is applied only to the relevant elements rather than to an entire application. Typically, when only a portion is rediscovered, the only change relative to whole-application discovery is that the entry point to the process is not the "root" entry point of the application as a whole, but rather one of the connections from which we want to perform the discovery or re-discovery.

FIGS. 2a-2c, taken together, form a simplified top-level flowchart illustration of a top-down initial discovery method constructed and operative in accordance with certain embodiments of the present invention. The method of FIGS. 2a-2c typically comprises some or all of the following steps, suitably ordered, e.g., as shown:

Step 120: Provide Application entry point, e.g., prompt user to manually provide or automatically derive, e.g., by querying another system (e.g., a user transaction monitoring system such as HP BAC or Aternity) which hold the entry points.

Step 125: If application corresponding to entry point provided in step 120 has never been discovered or system has decided (e.g. because re-discovery based on skeleton detected some change in the application structure) that the application topology stored in the application's skeleton is no longer up-to-date, proceed; otherwise, terminate.

Step 130: Prompt user to provide inputs a and/or b:

a. Knowledge base of patterns describing how to identify each component and connections from component identified to subsequent components. Knowledge base may be constructed in set-up stage in which each and every type of application supported is analyzed so as to determine some or all of: how to identify it (e.g., what is the process name and how to extract its version), how the application is installed, how the application is configured, where the application's configuration parameters reside, how to determine the configurations of the application's connections to other components. A pattern is then generated accordingly, which is operative to identify an individual application component and connections emanating from it.

b. Credentials to enable sufficient access level to each component (e.g., host) to retrieve all information employed by knowledge base Step 135: Use identity matching process (e.g., as per FIG. 3) that checks whether a discovered object, e.g., CI, was already discovered earlier, e.g., by using suitable attributes of each CI to uniquely identify it. Attributes of the CI are typically compared in a certain order e.g. as described herein with reference to FIG. 3.

Step 140: For entry point provided, create an initial connection according to the entry point type. It is appreciated that an entry point can have various attributes, also termed herein "parameters"; e.g., in the case of a URL, the entry point's attributes might include a port number and the URI. The type of entry point typically indicates which parameters or attributes are appropriate. For example:

Entry point type HTTP, parameters may be host, port, URL

Entry point type MQ, parameters may be host, port, queue name

Entry point type generic TCP, parameters may be host, port.

Step 150: If a hostname (as opposed to an IP address) is defined in the entry point:

Step 160: Perform DNS lookup for the hostname.

Step 170: If the hostname is resolved to multiple IP (Internet Protocol) addresses, generate a cluster object having the current connection as its input, and having outgoing connections per each resolved IP address with the same entry point values except replacing the hostname with the relevant IP address. This cluster object may be generated by creating an element of type DNS cluster and connecting that DNS cluster element to a list of hosts obtained from the DNS server.

Step 180: The current connection defines first and second connected applicative CIs. Look up, e.g., in a stored result of a previous network device discovery process, all NAT and other network devices en route between the first CI, and a second CI that has a dependency either from the first CI or from one or more intermediate CIs that have dependencies, ultimately, from the first CI. The route interconnecting the first and second CIs, which may run through many intermediate CIs, may run through multiple network devices.

According to one embodiment, there is a set-up process in which a separate discovery process for discovering network devices, including those which perform NAT, is performed.

Alternatively or in addition, information identifying NAT and other network devices' locations vis a vis configuration items is pre-configured into the system.

Step 185: Analyze NAT and other network devices found en route to see if the provided entry point is "affected", i.e., if the provided entry point points to an address that is being translated by an en route NAT device/network device (e.g., if the entry point is a virtual address/port on a network device that is mapped to a different address/port, the entry point is "affected"). If the provided entry point is affected, use the entry point information mapped (in step 180) after the network address translation to create a new connection.

Step 190: Check if OS (operating system) discovery for the host (also termed herein "target computer") pointed to by the entry point has not been performed yet (indicating the target computer was never discovered); if so, run OS discovery for this target host.

Step 200. Identify the relevant process running on the host, e.g., by identifying the unique process that is (a) running on the target host identified by the entry point's host name/IP address and (b) serving (listening to) the port whose number is designated at the entry point; and getting at least one attribute of that process, such as the process's name or other identifier, and the process's location, e.g., the directory where it is installed and/or the command line attributes the process was run with.

Step 210: Find, in the knowledge base, the discovery patterns which are applicable to the given entry point type and to the OS running on the target host Step 215: Execute all discovery patterns identified in step 210, one after the other, and stop as soon as one discovery pattern succeeds in discovering and creating a CI object.

Step 220: For the newly created CI object, run all of its deterministic connection pattern sections and for each discovered connection, create a connection object.

Step 230: If possible, reconcile newly created objects with existing objects in the topology database (using suitable identity matching logic, e.g., as per FIG. 3).

Step 240: If unresolved connections exist (connections on which steps 150-230 have yet to be run), define each such connection as an entry point and return to step 150 so as to recursively identify further elements dependent on that entry point. If no unresolved connections exist, end.

Patterns, e.g., as executed in FIG. 2, step 215, are now described in accordance with certain embodiments of the present invention. Typically, a pattern comprises a piece of logic that stipulates how to identify a certain type of entity. Such logic typically comprises a set of computer-executable rules stipulating that under certain conditions, the entity is of such and such a type. The logic of each pattern may be written in any suitable existing or special-purpose computer language.

A Pattern typically includes a set of rules and tests that identify which particular applicative component, such as, say, an Apache Web server, is used by a particular application. Rules may be used to extract suitable parameters and values, and to check various conditions on them. Some examples of possible rules:

Compare the process's executable name (or a prefix of it) to a suitable string; e.g., check if the name contains the string "httpd" as a prefix.

Run a local command line to get further information from the running process, such as its version, and check if the further information, e.g., version, matches a value. This can be used e.g. to write different patterns for Websphere version 5.3 vs. Websphere version 6.1.

Look for a particular template in some configuration file, extract parameters from the configuration file according to that template, and check some condition on them (e.g., is the file in xml format, and does it contain some predefined value).

Look for the existence of a file of particular name to e.g. determine if a certain component is installed on that target host.

Extract suitable configuration parameters, such as but not limited to IP addresses and/or version information) from the registry (typically on Windows servers only) and check some condition on these, e.g. by checking the version number to match some value and then deducing the version of the installed component.

The pattern typically includes an identification section and one or more connection sections as described below. Typically, rules and tests are part of all sections and are performed by the discovery process, e.g., as shown and described herein. Typically, the method performs the identification section. Typically, only when and if performing the identification section is successful in finding a match, e.g., in identifying the applicative element, the method performs the respective connection sections of the pattern, in order to find all connections from this applicative element to other elements. For example, for an Apache pattern, the method may create an Apache element or CI and then try to find the connections from the Apache CI to other elements.

Typically, each pattern is responsible for discovering and generating a CI of only a certain type.

Each Pattern Connection Section typically includes a portion of a pattern that describes how to locate connections from the pattern's entity to other entities, e.g., by extracting relevant information, including dependent entities and entry points thereof, from at least the configuration files and/or the registry.

Typically, rules in the connection section mandate searching for particular configuration files, e.g., in the directory where the executable process is installed, trying to parse these files in a specific given format, suitably extracting parameters from the files, and as a result identifying the entry points to elements with which the current entity is communicating. As an example, an application server usually has a configuration file that stores a definition of which database the application server is using and how to connect to it. When a connection section fails, e.g. because the configuration file was not found, or because it could not be parsed according to the template mandated by the connection section, the corresponding connection may not be created.

A result of performing a pattern connection section is typically a list of new connections, each connection associated with an entry point. The new entry point would typically include a host or IP address for the dependent element, a port number and a URL and/or other applicative parameters.

As described above, each Pattern Identification Section typically includes a portion of a pattern, typically including a set of rules and conditions, which is operative to identify an entity. This would typically take into account at least the process name and methods (either or both) to extract the version information.

Typically the identification section includes instructions on how to extract various parameters or values, and conditions on such values and parameters.

For example, the process executable name can be extracted and compared via string operations to a predetermined string. Alternatively or in addition, entity identification may include searching for particular files installed on the host, checking information in the registry and parsing certain files. When the pattern identification section is successful, a CI object is generated and stored in a database. "Success" typically refers to a state in which all rules/tests that were to be performed were completed and the logical condition in each rule was met. For example, if the condition checks if the process name contains some value, then indeed that value was contained in the process name. If the condition checks if a file of a particular name existed, then it indeed was found to exist.

A suitable identity matching process, e.g., for use in FIG. 2c, step 230 and/or as input for the method of FIG. 8, as described in step 410, is now described with reference to the example process of FIG. 3.

The identity matching process strives to ensure each CI is kept only once without duplicates, e.g., by identifying and eliminating duplicates, rather than entering them into a topology database.

Typically, the identity matching process checks whether a discovered object, e.g., element, was already discovered in the context of any discovery that was done earlier and that was used to fill the topology database with CIs and connections.

It is possible for a single CI to be discovered by multiple sources (e.g., integration into other suitable management systems such as but not limited Vmware vCenter or EMC management suite, querying hosts and other devices using various protocols like WMI, ssh and SNMP, or listening to network traffic). Also, these different sources may provide different data. Therefore, each time a CI is identified, its properties are typically compared to existing CIs, e.g., as described herein with reference to FIG. 3, to eliminate duplicates in the topology database. Reconciliation may be achieved by defining, for each property, a trusted source of information from among the multiple sources of information that may be available.

FIG. 4 is an example method for creating an application skeleton, based on an application topology as discovered. The topology is typically represented as a graph, with each node representing an element and dependencies between elements being represented as arcs or edges.

According to certain embodiments, the skeleton generation process may be characterized in that if there are multiple nodes that are of the same "instance", the skeleton includes only one node that stands for all of the multiple nodes. The term "Of the same instance" means nodes that are all of the same application type and all have the same incoming and outgoing connections. Typically, the one included node is one of the multiple nodes.

The method may pick a random node and assume that all other nodes are the same, as long as they have the same connections (in and out).

Figure 6A:
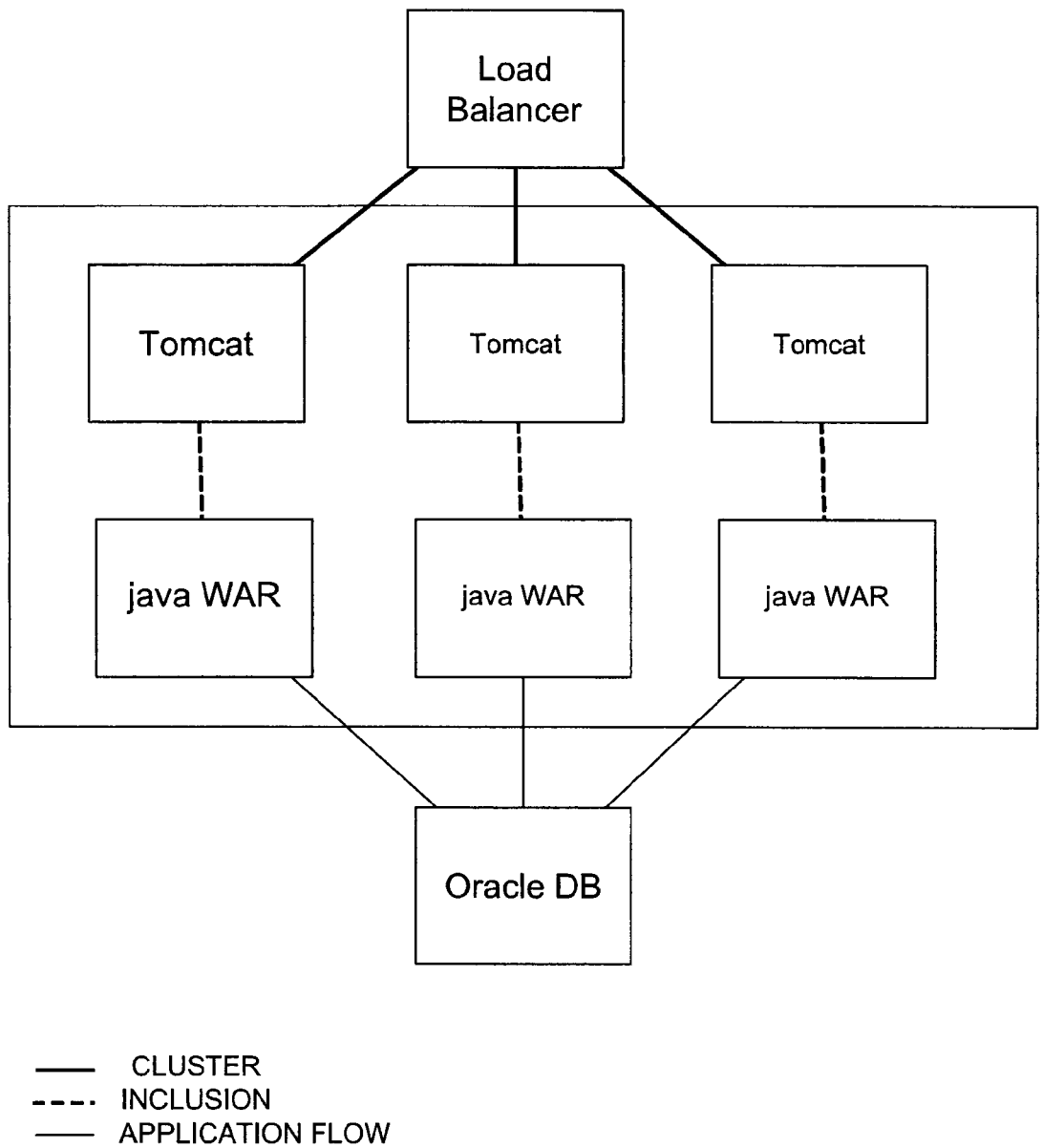
FIG. 6a is a diagram of an example of a skeleton constructed and operative in accordance with certain embodiments of the present invention.
Figure 6B:
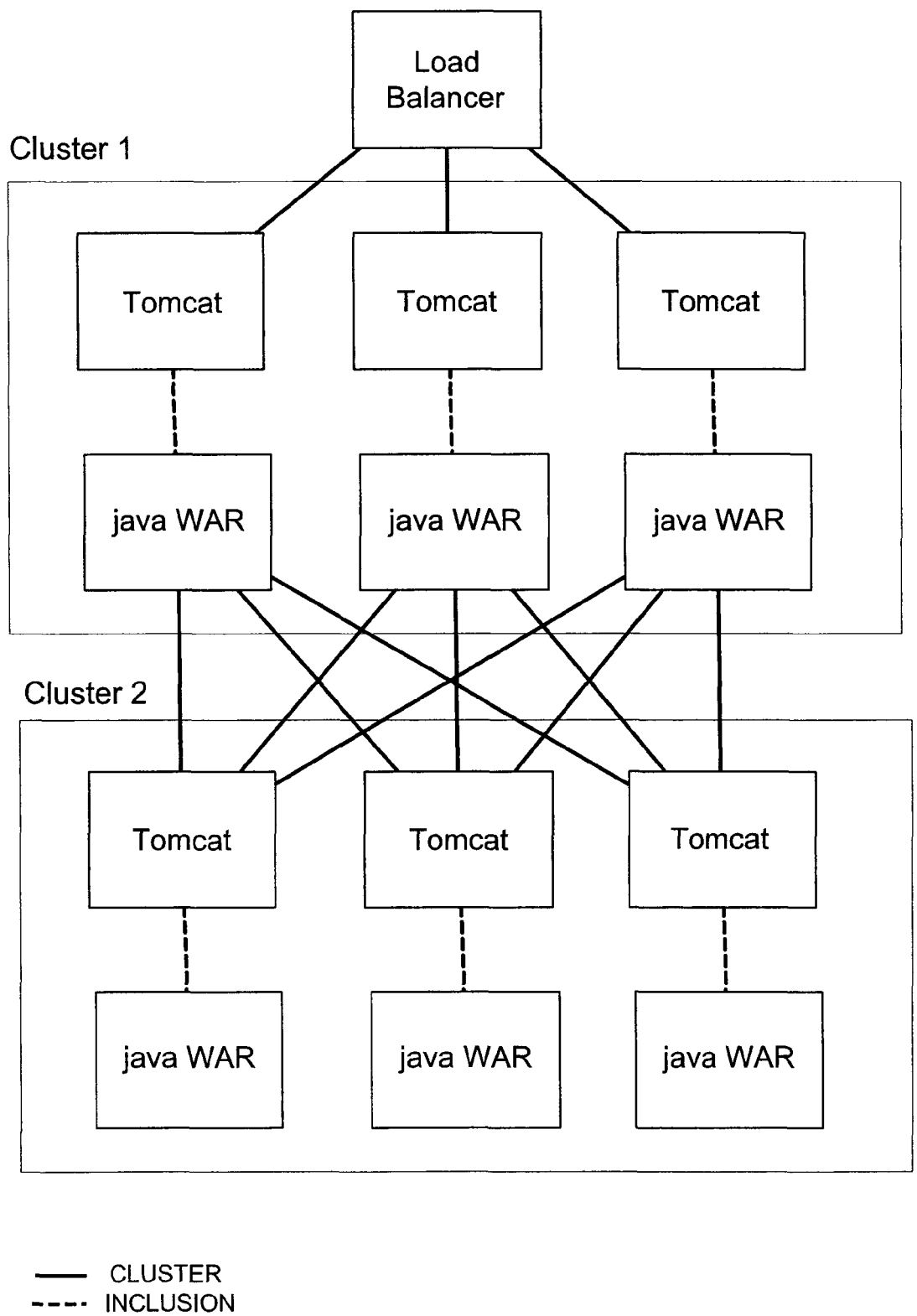
FIG. 6b is a diagram of an example of an application topology constructed and operative in accordance with certain embodiments of the present invention.

For example, referring to the topology shown in FIG. 6b, when traversing the "Apache tomcat" nodes shown, a skeleton node may be created for the first tomcat node encountered in the application topology, and when the other two "tomcat" nodes are traversed, these are also deemed to correspond to the same skeleton node since they are also "tomcat" nodes, and, as shown, they have the same connections as the first tomcat node.

According to certain embodiments, a skeleton is created using a suitable "applicative cluster creation process", which groups "similar" nodes in the graph. Nodes are "similar" if they have the same incoming connections, e.g., in terms of entry point type, the same CI type and the same outgoing connection, again in terms of entry point type. A suitable applicative cluster creation process" is now described.

Applicative Clusters are aggregation/consolidation of same-type CIs at the same tier of an application (e.g., a cluster of web servers, a cluster of workers' workstations, etc.). Their computation may be based on the connection a pattern would create.

Typically, patterns in the knowledge base include sets of rules that are performed to determine/discover CIs and their connections to other CIs. The pattern can determine that the CI is connected to a cluster of CIs rather than to one specific CI; e.g., a load balancer may be discovered that is connected to a cluster of Apache servers. In this case the connection created would be to a cluster. The discovery process would then continue to discover each of the elements of the cluster. The skeleton itself typically includes an indication of the cluster of Apache servers but does not include information about the individual servers in the cluster.

If a given pattern creates a Cluster connection, e.g., as described above, then all the elements discovered as a result of the discovered cluster connections may be marked as belonging to the same applicative cluster. For clusters with more than one tier, the next tiers may be included in the applicative cluster recursively until one of the following is met:

1) All connections are merged to a single CI, e.g., as shown in the skeleton of FIG. 6a; [or
2) More cluster connections indicating a new cluster has been encountered, e.g., as shown in the skeleton of FIG. 6b.

When either of the above conditions occurs, the computation of the cluster is complete.

In FIGS. 6a-6b, bold lines indicate cluster relationships, dashed lines indicate inclusions and solid non-bold lines indicate application flow.

Figure 5:
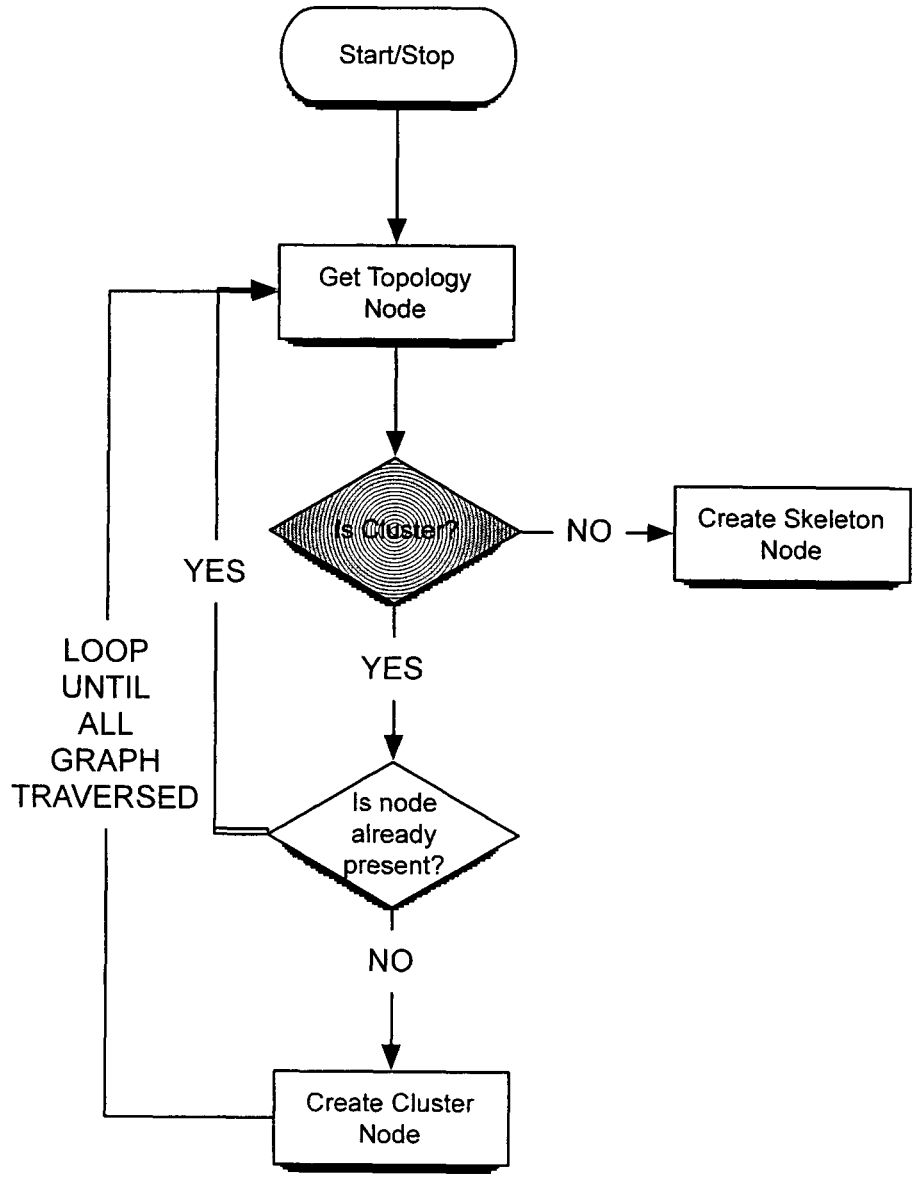
FIG. 5 is a simplified flowchart illustration of an example "applicative cluster creation process" useful, inter alia, in conjunction with the skeleton derivation method of FIG. 4, the method being constructed and operative in accordance with certain embodiments of the present invention.

A simplified flowchart illustration of an example "applicative cluster creation process" is shown in FIG. 5.

Typically, nodes can be interconnected by more than one category, each category including more than one "type" of connection. Each type of connection includes different parameters required to define that connection. Connection categories may include one or more of:

a. Application flow category—Connection between two applicative elements; e.g., tomcat talking to a database. The connection type in this case may be, e.g., the protocol (e.g. http, sql).
b. Cluster connection category—Connection from one element to a cluster (also termed herein "applicative cluster" or farm of other elements).
c. Inclusion connection category—This may be used internally for elements containing other elements; e.g., some application server can contain multiple WARs in which case an inclusion connection of type WAR may be created to each of them.

Typically, each pattern generates a CI of a particular type, wherein the pattern determines the type; e.g., if a pattern is used to discover Tomcat, then the pattern generates a CI of type Tomcat. Typically, the number of patterns can change over time and the users can add their own patterns; therefore, the totality of defined CI types may change over time and may be stored, e.g., in the knowledge base of the patterns.

Typically, each connection is deduced by a specific pattern, and, once deduced, the "Type" of the connection is attached to it, e.g., in the stored graph representation of the relevant application.

The method of FIG. 5 is useful, inter alia, for deriving a skeleton from a structure generated by the method of FIGS. 2a-2c, wherein the skeleton includes information useful for quick subsequent re-discovery of the application. The "IS Cluster" step in FIG. 5 determines whether or not an individual node is a member of a cluster. Any suitable heuristics may be employed to make this determination. For example, it may be assumed that if one node in tier X is (say) an Apache, then all other nodes in the same tier are also Apaches, and/or it may be assumed that if an Apache node has CI types Y and Z below, so do all other Apache nodes have Y and Z connected to it.

The method of FIG. 4 typically comprises some or all of the following steps, suitably ordered, e.g., as shown:

Step 300. Provide structure generated by initial discovery and stored in step 20.

Step 310: Use application topology discovered in the initial discovery of step 10 as stored in step 20, to generate a template for the application topology including division into tiers and application flows between tiers.

Step 320: Gather from actual discovered topology NAT and other network devices along the path that affect the application flow and the address translation applicable to each of them; add this to initial skeleton generated in step 310.

Step 330: Modify template: Replace discovered clusters of CIs with a generic cluster placeholder to accommodate changes within a cluster without affecting the skeleton.

Step 340: Modify template: Delete host information for CIs so these are not stored in the skeleton, i.e., so that only the applicative CIs are stored. This allows applications to move between hosts without this motion being considered a skeleton change.

Step 350: Add to template: For each tier & CI, add the discovery pattern and the identification section inside it that were used to discover it.

Step 360: Add to template: Define a re-discovery frequency per tier as one of: High/medium/low (the exact frequency in minutes per each category may be user defined in the administrative preferences).

Step 370: Add to template: Credentials used per each identified CI. Note: This is the only skeleton component that is stored per identified CI and not per tier.

Step 380: Add Impact rules describing how events should be propagated along the application structure (an example for such a rule: "If 30% of cluster members are down, mark the application as yellow. If 50% are down, mark it as red").

Step 390: Add manually defined discovery refinements, e.g., out of the following types:
1. Manually added connections
2. Manually added entry points to the application
3. CI tiers and/or connections marked as application boundary not to be followed FIG. 7 is a simplified top-level flowchart illustration of a skeleton-based discovery method constructed and operative in accordance with certain embodiments of the present invention. The method of FIG. 7 typically comprises some or all of the following steps, suitably ordered, e.g., as shown:

Step 610: Obtain current application structure (e.g., using top-down discovery).

Step 620: Store structure as discovered.

Step 630: Derive skeleton from structure stored in step 620.

Step 640: Periodically re-discover structure using skeleton info derived in 630

Step 650 Periodically, less frequently than in step 640, run full discovery to find any changes in skeleton itself. If any changes found, go back to step 630.

FIG. 8 illustrates a method for skeleton-based re-discovery, which may be executed for an entire application. It is appreciated that a skeleton typically includes attributes that are less likely to change but occasionally these attributes do change. Typically, once in a while, say once a day, a complete re-discovery is effected, and any changes that would make an existing skeleton invalid are incorporated into a new skeleton based on the complete re-discovery. Typically, if no skeleton exists, e.g., if previous discovery was top-down but not skeleton-based, re-discovery may simply comprise redoing the previous discovery entirely. However, when it is desired to re-discover only a portion of an application, then typically, the discovery process does not start from the "root" entry point and instead starts from a connection in the topology, which is the starting point to the portion of an application that it is desired to re-discover. Thereby, only the relevant portion of the topology is (re)discovered.

Skeleton-based re-discovery typically comprises a re-discovery of an application topology, which is a repetitive discovery for updating an application topology that was already discovered earlier and for which a skeleton was generated. The skeleton-based re-discovery process utilizes the information stored in the skeleton in order to perform a re-discovery much faster than an initial discovery. The process may also re-use information that was deduced or manually provided during the initial discovery process. The result of a skeleton-based re-discovery may comprise either an updated application topology, if it is found that the basic application topology (skeleton) has not changed, or a trigger to re-perform initial discovery if the skeleton does not match the identified application topology (initial discovery may only be triggered for the part of the application that needs to be re-discovered).

The method of FIG. 8 typically comprises some or all of the following steps, suitably ordered, e.g., as shown:

Step 410: Provide:
a. Application skeleton, which typically includes entry point and relevant knowledge base parts to apply in each tier.
b. Credentials to enable sufficient access level to each component (e.g., host) to retrieve all information required by the knowledge base.

Step 420: Traverse the application skeleton generated by FIG. 4.

Step 430: For each skeleton connection a discovery task is created with information that was stored in the skeleton. The information typically includes at least some of: the pattern that is to be executed, credentials that are to be used and/or the frequency with which this task need to be performed.

Step 440: Until skeleton is deemed invalid, perform all tasks created in step 430 (given its frequency). A skeleton is deemed invalid when the discovery process finds changes that contradict the current skeleton structure. This can happen, e.g., if a previously discovered connection is gone, or if some CI type has changed.

Step 450: Use result of step 440 to update the topology of the application in case changes are detected.

Step 460: If failures are detected and/or if new information is discovered that is inconsistent with that stored in the skeleton (e.g., a connection in the skeleton points to a WebSphere component, but we are no longer able to discover a WebSphere component there), mark skeleton as invalid and re-initiate Initial Discovery process on at least part of the application.

Referring now to FIGS. 9 and 10, it is appreciated that uses for skeleton-based discovery include application of policies at the skeleton level. Typically, such policies are associated in computer memory, with logical elements (e.g., a "tier") of each application rather than only to specific instances of such logical elements.

Typically, policies are defined on particular queries on the skeleton. For example, in a certain tier there may be a varying number of instances, perhaps currently 4 instances, residing currently at 4 respective known IP addresses a1, . . . a4, and a policy may be defined, according to which the average CPU utilization of these instances cannot exceed 70%; if 70% is exceeded, an alert is sent and/or a new instance is created.

This is a tier-level condition ("if CPU utilization averaged over all instances in the tier is greater than 70%"), which is far more stable, rather than a far less stable instance level condition ("if average CPU utilization of the elements located at the following 4 IP addresses a1, . . . a4 is greater than 70%"), which becomes inapplicable each time the number or identity of the instances in the tier change.

The generation of and use of impact tree, based on an existing skeleton, is now described below with reference to FIGS. 9 and 10. Example: A Tier may include 8 Apache servers: If more than 4 (say) are down, this causes impact toward the root of the tree, which is critical. Thus if 4 are down, there is an error. If 6 are down, this may have critical results. Typically, re-discovery is executed periodically, e.g., every few minutes, and subsequently queries are re-sent and the impact is determined anew. From this discovery, an impact tree may be generated. It is appreciated that an impact may propagate to the root of the tree and affect the state of the business service as a whole.

The impact tree is based on a specific skeleton, e.g., as shown in FIGS. 9 and 10. It is appreciated that the skeleton is a useful tool for building the impact tree and for subsequently using the impact tree for efficiently maintaining the state of each of the elements of an application represented by the impact tree, including prioritization of maintenance operations between the various elements.

The method of FIG. 9 typically comprises some or all of the following steps, suitably ordered, e.g. as shown:

Step 510: Generate skeleton from application structure.

Step 520: Derive default impact tree from skeleton. For example, define default impact tree such that:

a. For non-clustered children in skeleton, the computed state of the parent in the default impact tree is the state of the child.

b. For clustered children in skeleton, the state of the parent in the default impact tree is defined to be the state of the child whose state is most severe; e.g., if one child is in critical state then the state of the parent is critical. If all the children are "Healthy" other than one child whose state is "Warning", then the state of the parent is "Warning".

Step 530: Let user change defaults if desired; e.g., a functionality may be provided that changes the rule regarding clustered children to be: If there are less than 4 elements in state "Healthy", then computed state of cluster is "Warning". If there are less than 3 healthy elements, state is "Error". If there is only one healthy element, state is "Critical".

Step 540: Each time status of an element of an application changes, recomputed the impact tree:

Step 550: For each parent Y of element X

Step 560: Compute new state of Y according to impact rules

Step 570: Set the state of Y to the more severe between its current state and the state computed in step 60. If state of Y changes, then steps 50 and 60 are of course performed for each parent of Y Step 580: Use impact tree to show state of entire application. E.g. on a dashboard show all discovered applications, each colored or otherwise designated according to its state/health. Also can use impact tree for what-if scenarios: e.g. show what would be the status of a given application if a certain element status changes. Determine accordingly if an element can be removed or can be serviced at a certain time.

The method of FIG. 10 typically comprises some or all of the following steps, suitably ordered, e.g., as shown:

Step 1010: Receive event changing the status of element X.

Step 1020: For each Y parent of X, use the impact tree rules and the new status of X to compute the new status of Y, and update it to the more severe between this newly computed value and its own value.

Step 1030: If status of Y changed, repeat step 1020 with Y instead of X

The methods of FIGS. 9 and 10 are useful for implementing skeleton-based policies. Policy compliance checking includes generating an output or display indicating that a non-compliance with a certain policy has been found, such as, say, exceeding of a policy limit on the maximum number of elements/instances in a tier, or of policy limits on various KPIs (key performance indicators), such as but not limited to a maximum policy value for CPU utilization at the tier level having been exceeded. Policy enforcement refers to taking appropriate action such as but not limited to sending an alert, or actually adding a new instance to a tier in order to fix a breach of policy.

Two examples of skeleton-level policy applications are as follows:

a. —Skeleton-level representation and enforcement of Affinity policies according to which, say, instances of a certain first tier are not allowed to be co-located on the same physical server as instances of a certain second tier. To implement this at skeleton level, the policy is associated with the tier in the skeleton, rather than with individual nodes in the application topology, which may change as frequently as every few minutes. Another example of an affinity policy that can be represented and enforced at the skeleton level in accordance with certain embodiments of the present invention is that a specific node may not be allowed to reside on a server in some particular geography.

b. Skeleton-level representation and enforcement of Network policy—e.g., that instances in a particular tier requires a Gigabit connection. To implement this at skeleton level, the policy is associated with the tier in the skeleton, rather than with individual nodes in the application topology, which may change as frequently as every few minutes.

Figure 11:
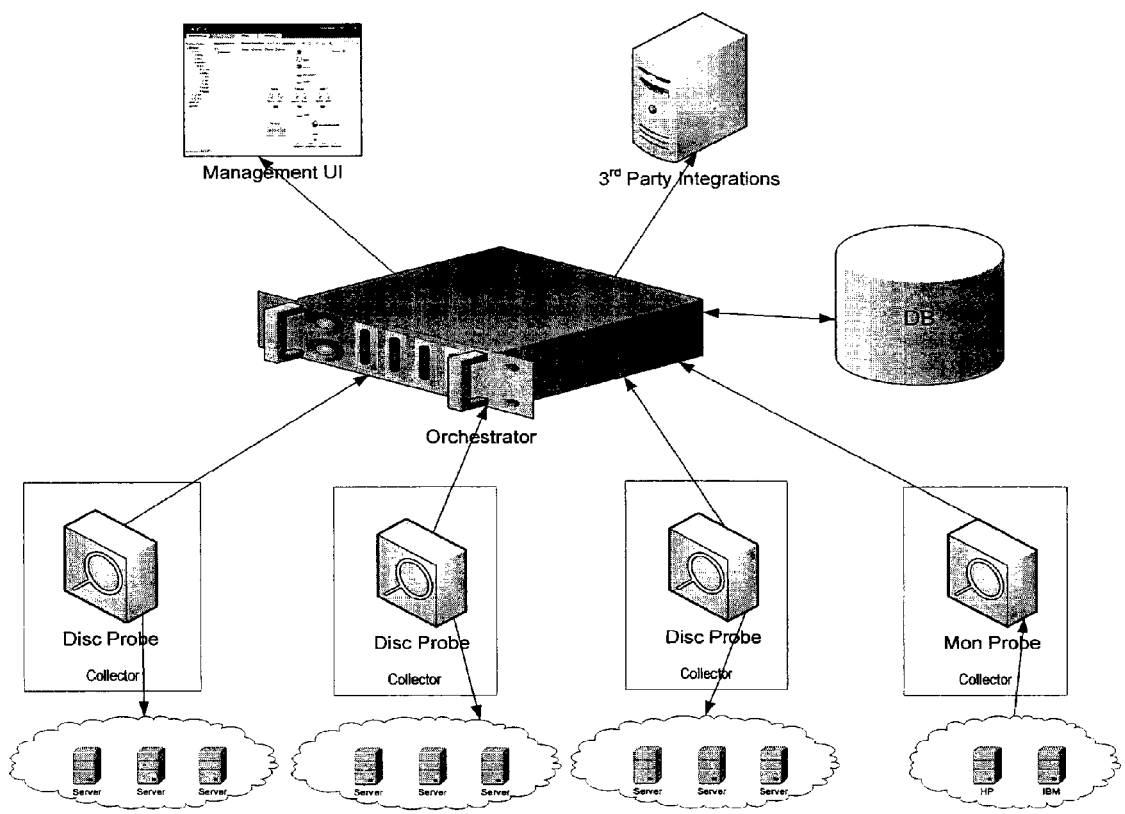
FIG. 11 is a simplified functional block diagram illustration of a system architecture constructed and operative in accordance with certain embodiments of the present invention, which is useful for performing methods shown and described herein.

FIG. 11 is a simplified functional block diagram illustration of a system architecture useful for performing application structure generation, impact management and maintenance prioritization methods shown and described herein, for at least one given enterprise data center. The apparatus of FIG. 11 typically includes a main server also termed herein an "orchestrator", collector/s over which tasks to be performed in parallel, which may be distributed, and a database. The collectors perform "discovery tasks" including presenting queries to hosts and determining an identity (e.g., "load balancer") of an encountered element and its dependencies; this information typically is fed to the server/orchestrator. The database stores a knowledge base, typically including a pattern per known applicative component; application topology information, typically including a skeleton per each application; and the CIs, impact information, and any other information the system may be using. From a security point of view, different collectors may be authorized, vis a vis different servers, with optional overlap between them. Load balancing may optionally be provided between collectors serving the same server/s.

Typically, only discovery tasks are distributed to the collectors: It is appreciated that some or all of the following functionalities as described herein may be performed by the main server: initial discovery, skeleton builder, quick re-discovery, impact management, skeleton-based policy application, and handling of routine maintenance.

According to certain embodiments, when an applicative component is encountered, the method of the present invention determines: Is this applicative component in the knowledge base, in which case we have a pattern for it? Typically, e.g., as described herein, each pattern includes an application-specific set of rules for identifying a particular application and the connections from it. For example, for an Apache application, the documentation of a typical Apache installation may be analyzed in order to determine what is the process name and/or how to extract the relevant configuration.

If the applicative component type is in the knowledge base, the method typically determines if the customer used the application component in a standard way; if so, the method uses the set of rules or tests in the applicative component's pattern to identify if the applicative component is used or not for this entry point.

If the applicative component type is in the knowledge base, and the component is used in a standard way then it would typically be identified by the discovery process when the appropriate pattern is reached. The set of rules or tests in the applicative component's pattern may be used to identify the applicative component and then to extract the connections from it to subsequent components.

If the customer used the application component in a non-standard way, e.g., used parameters in another way or hard-coded, the pattern associated with the application component in the knowledge base may not work. In this case, the user may be allowed to create a new pattern, or to modify an existing one, to support the new or modified application. This can be done using a pattern editor, e.g., by changing an existing pattern or by creating a new pattern from scratch. If the pattern is NOT in the knowledge base, the method may show an error indicating that the current element could not be identified. Typically, the method does not continue until the error is fixed, typically by human intervention. The system may suggest to the user possible ways to continue, e.g., by using a network sniffing module to identify possible connections. If the sniffer is successful in determining which outward communication is relevant to the application, such nodes may be added to the existing topology and the method may then continue.

It is appreciated that analysis of a complex computerized enterprise data center to determine the structure thereof is extremely useful for maintenance of the complex computerized enterprise. This is because individual elements not infrequently go out of order, causing a large number of calls to the information technology maintenance team in the enterprise. It is advantageous to prioritize these calls, rather than handling them in random or first-in-first-out order. If the structure of the applications in the enterprise data center is known and is up-to-date, prioritization of elements can be defined, e.g., by combining (using a maximum, average or other suitable formula) the importance of all applications affected by, e.g., utilizing, each particular element that is down. Also, replacement fixes can be implemented by temporarily assigning a replacement element to affected applications. Structure determination is also useful for servicing an enterprise application. For example, if a servicing operation involves disconnecting a particular element that has an impact on one or more critical applications, that servicing may be scheduled accordingly, e.g., at night, or a replacement element may be temporarily assigned to the affected critical applications.

It is appreciated that terminology such as "mandatory", "required", "need" and "must" refer to implementation choices made within the context of a particular implementation or application described herewithin for clarity and are not intended to be limiting, since in an alternative implantation, the same elements might be defined as not mandatory and not required or might even be eliminated altogether.

It is appreciated that software components of the present invention including programs, and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored, e.g., in memory or on an information network such as the Internet, before or after being downloaded, which embodies any or all of the steps of any of the methods shown and described herein, in any suitable order, and the method of uploading or downloading such, and a system including server/s and/or client/s for using such; and hardware that performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices that have the capacity to yield a structure, or perform a function, described herein, such that even though users of the device may not use the capacity, they are if they so desire able to modify the device to obtain the structure or function.

Features of the present invention that are described in the context of separate embodiments may also be provided in combination in a single embodiment. Conversely, features of the invention, including method steps, which are described for brevity in the context of a single embodiment or in a certain order, may be provided separately or in any suitable subcombination or in a different order. The term "e.g." is used herein in the sense of a specific example that is not intended to be limiting. Devices, apparatus or systems shown coupled in any of the drawings may in fact be integrated into a single platform in certain embodiments or may be coupled via any appropriate wired or wireless coupling, such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized method for determining a structure of at least one application in a computerized organization, the method comprising: receiving at least one entry point including an identification of a virtual location on a computer network; for each entry point, receiving a determination of an individual applicative component that processes data arriving through that entry point; identifying at least some communicating entry points through which the first applicative component communicates with additional applicative components; and for each of said at least some communicating entry points, using a processor for determining the applicative component that processes data arriving through that communicating entry point; and providing at least a portion of a structure including: applicative components associated with the application and information with regard to which of said applicative component communicates with which.

2. A method according to claim 1 wherein the computerized organization resides on an organizational computer network and wherein at least one entry point includes an identification of a virtual location on the organizational computer network.

3. A method according to claim 1 wherein said receiving a determination comprises determining an individual applicative component that processes data arriving through that entry point.

4. A method according to claim 1 wherein said identifying comprises identifying all communicating entry points through which the first applicative component communicates with additional applicative components.

5. A method according to claim 1 and also comprising repeating the identifying and the receiving of a determination, at least once, to identify further communicating entry points for applicative components determined thus far and to determine further applicative components that process data arriving through said further communicating entry points.

6. A method according to claim 5 and wherein the identifying and the receiving of a determination are repeated until no further communicating entry points can be identified and no further applicative components can be identified.

7. A method according to claim 1 wherein identification of applicative components that process data that ultimately arrived from an individual entry point is conducted depth-first.

8. A method according to claim 1 wherein identification of applicative components that process data that ultimately arrived from an individual entry point is conducted breadth-first.

9. A method according to claim 1 and also comprising using said structure to perform at least one computerized organization maintenance operation on at least one application.

10. A method according to claim 9 wherein said computerized organization maintenance operation comprises impact management.

11. A method according to claim 1 wherein said at least one application includes a plurality of applications and wherein said method also comprises generating a knowledge base storing information regarding respective structures of the plurality of applications.

12. A method according to claim 1 and also comprising using said structure to prioritize calls to a computerized organization maintenance facility including using said structure to identify applications whose components are down, establishing priorities between said applications and sequencing repair of components that are down, depending on said priorities.

13. A method according to claim 1 and also comprising using said structure to prioritize calls to a computerized organization maintenance facility including using said structure to identify applications whose applicative components are down, establishing priorities between said applications and temporarily replacing at least some components that are down with other components, depending on said priorities.

14. A method according to claim 1 and also comprising using said structure to schedule non-emergency maintenance including using said structure to identify maintenance-affected applications whose components are expected to be non-operational during said maintenance and scheduling the non-emergency maintenance at selected hours depending on the importance of the maintenance-affected applications.

15. A method according to claim 1 and also comprising using said structure to identify maintenance-affected applications whose components are expected to be non-operational during routine maintenance and compensating the maintenance-affected applications by temporarily replacing the components that are expected to be non-operational during routine maintenance.

16. A method according to claim 1 wherein said organization includes a multiplicity of applications and wherein said method also comprises using said structure to re-discover only a selected subset of applications that are of interest, from among the multiplicity of applications, rather than re-determining the structures of all of said multiplicity of applications of which many are not of interest.

17. A method according to claim 3 wherein at least one determining step for at least one entry point comprises finding a unique characteristic of an applicative component.

18. A method according to claim 17 wherein said unique characteristic includes at least one of a Process name, and a configuration file characteristic.

19. A method according to claim 1 wherein said providing at least a portion of a structure comprises storing said portion in a computer storage device.

20. A computerized re-discovery method for a computerized organization including a multiplicity of applications, the method comprising: using a processor for determining a structure of at least one application in the computerized organization; and using said structure to re-discover only a selected subset of applications that are of interest from among the multiplicity of applications, rather than re-determining the structures of all of said multiplicity of applications of which many are not of interest.

21. A computerized re-discovery system for a computerized organization including a multiplicity of applications, the system comprising: apparatus for determining a structure of at least one application in the computerized organization; and re-discovery apparatus employing a processor for using said structure to re-discover only a selected subset of applications that are of interest, from among the multiplicity of applications, rather than re-determining the structures of all of said multiplicity of applications of which many are not of interest.

22. A method according to claim 16 wherein said using said structure to re-discover does not start from a "root" entry point and instead starts from a location in the structure that is a starting point to a portion of the structure that it is desired to re-discover.

23. A computer program product, comprising a non-transitory computer usable medium having a computer readable program code embodied therein, said computer readable program code adapted to be executed to implement a computerized method for determining a structure of at least one application in a computerized organization, the method comprising: receiving at least one entry point including an identification of a virtual location on a computer network; for each entry point, receiving a determination of an individual applicative component that processes data arriving through that entry point; identifying at least some communicating entry points through which the first applicative component communicates with additional applicative components; and for each of said at least some communicating entry points, using a processor for determining the applicative component that processes data arriving through that communicating entry point; and providing at least a portion of a structure including: applicative components associated with the application and information with regard to which of said applicative component communicates with which.

24. A computer program product, comprising a non-transitory computer usable medium having a computer readable program code embodied therein, said computer readable program code adapted to be executed to implement a computerized re-discovery method for a computerized organization including a multiplicity of applications, the method comprising: using a processor for determining a structure of at least one application in the computerized organization; and using said structure to re-discover only a selected subset of applications that are of interest, from among the multiplicity of applications, rather than re-determining the structures of all of said multiplicity of applications of which many are not of interest.

* * * * *